(12) United States Patent
Zywno

(10) Patent No.: US 6,516,517 B2
(45) Date of Patent: Feb. 11, 2003

(54) FLUID BEARINGS AND VACUUM CHUCKS AND METHODS FOR PRODUCING SAME

(76) Inventor: Marek Zywno, 7049 Bret Harte Dr., San Jose, CA (US) 95120

( * ) Notice: Subject to any disclaimer, the term of this patent is extended or adjusted under 35 U.S.C. 154(b) by 0 days.

(21) Appl. No.: 10/039,969

(22) Filed: Dec. 31, 2001

(65) Prior Publication Data

US 2002/0054717 A1 May 9, 2002

Related U.S. Application Data

(62) Division of application No. 09/434,600, filed on Nov. 5, 1999, now Pat. No. 6,390,677, which is a division of application No. 09/023,376, filed on Feb. 13, 1998, now Pat. No. 5,989,444.

(51) Int. Cl.[7] ............... B21D 53/10; B29C 65/02
(52) U.S. Cl. ............ 29/898.02; 29/458; 29/427.1; 29/469.5; 29/743; 29/DIG. 44; 156/285; 427/208.2
(58) Field of Search ............... 29/898.02, 418, 29/419.1, 458, 527.1, 469.5, 743, DIG. 44, 421.1; 156/285; 427/208.2; 384/12, 103, 111, 112, 113, 123; 279/3; 269/21

(56) References Cited

U.S. PATENT DOCUMENTS

| | | | |
|---|---|---|---|
| 3,022,614 A | * | 2/1962 | Dreyfus et al. |
| 3,322,598 A | * | 5/1967 | Marks et al. |
| 3,984,039 A | * | 10/1976 | Hawley et al. |
| 4,422,893 A | * | 12/1983 | Duchateau et al. |
| 4,978,233 A | * | 12/1990 | Stotzel et al. |
| 5,488,771 A | | 2/1996 | Devitt et al. |
| 5,572,598 A | | 11/1996 | Whil et al. .......... 382/144 |
| 6,012,845 A | * | 1/2000 | Lyon |

FOREIGN PATENT DOCUMENTS

| | | | |
|---|---|---|---|
| GB | 1180597 | * | 2/1970 |
| JP | 55-115973 | * | 9/1980 |
| JP | 05-044716 | * | 2/1993 |
| JP | 09-329129 | * | 12/1997 |

OTHER PUBLICATIONS

IBM Technical Disclosure. "Air Bearing Cosntruction" vol. 16, Issue 12, May 1, 1974.*

* cited by examiner

Primary Examiner—Gregory M. Vidovich
Assistant Examiner—Eric Compton
(74) Attorney, Agent, or Firm—Blakely, Sokoloff, Taylor & Zafman LLP

(57) ABSTRACT

Fluid bearings, vacuum chucks and methods for producing these devices. One example of a method for forming a fluid bearing includes forming a plate having a face surface and a bonding surface, coupling a first side of a body to the bonding surface, placing the face surface of the plate against a predetermined surface, and generating a pressure difference to conform the face surface to the predetermined surface. One example of a fluid bearing of the invention includes a plate support and a flexible bearing plate having a bonding surface which is attached to the plate support with an adhesive which is flexible before hardening. The flexible bearing plate conforms to a predetermined surface during a portion of the time that the adhesive hardens. Examples of vacuum chucks, and methods for forming vacuum chucks, and other aspects of the invention are described.

11 Claims, 19 Drawing Sheets

FLUID BEARINGS AND VACUUM CHUCKS AND METHODS FOR PRODUCING SAME

This application is a divisional application of U.S. patent application Ser. No. 09/434,600, filed Nov. 5, 1999, now U.S. Pat. No. 6,390 677, which is a divisional application of U.S. patent application Ser. No. 09/023,376, filed Feb. 13, 1998, now U.S. Pat. No. 5,989,444.

BACKGROUND OF THE INVENTION

1. Field of the Invention

The present invention relates to fluid bearings, vacuum chucks, and other devices and methods for producing these items. In one embodiment, the invention relates to a method of manufacturing tools and machinery that may be used during the semiconductor manufacturing process.

2. Description of Related Art

Fluid film bearings are generally formed by a pressurized film of fluid (gas or liquid) contained between two surfaces, conforming to each other with a small gap of approximately uniform thickness existing between the surfaces. These two surfaces may be referred to as the guideway and the fluid film bearing surface or plate. The shape of these members depends on the kind of kinematic constraint realized by the bearing. There are numerous types of fluid bearings, including rotary, cylindrical, flat, spherical, and conical. For example, for rotary motion about an axis, the bearing is formed by two cylindrical, conical or spherical surfaces with a small radial gap between the surfaces of the fluid film bearing plate and the guideway. The fluid film bearing of a spherical pair is free to rotate about the center of the sphere. In one embodiment, the fluid film bearing plate is the moving member and the guideway is the stationary member on which the fluid film bearing plate moves. The converse is also true. The moving member of a cylindrical pair is free to rotate about the axis of the cylinders as well as to translate along the axis.

Typically the bearing is subdivided into several areas, each one having its own bearing surface and restrictors with means for evenly distributing the pressure of the fluid film in order to maximize the load bearing capacity and to achieve optimal bearing stiffness.

Fluid film bearings are formed by either drawing the fluid into the gap by slightly wedging the entrance to the gap and using the fluid viscosity and the motion of the moving member (e.g., fluid bearing) relative to the stationary member (e.g., guideway) to draw the fluid into the gap dynamically, or by externally pressurizing the fluid and pumping it into the gap. This fluid film is delivered to the bearing gap through a pattern or system of grooves (or channels) made in one of the bearing surfaces.

Thus, fluid bearings (and vacuum chucks which are a type of fluid interface) often require a pattern, such as a pattern of grooves, to be created on a surface. An engraving machine, milling machine or stamping press is often used to manufacture a pattern, such as a pattern of grooves on an air bearing or a vacuum chuck. As a result, the patterns are slowly traced along each groove and recreated, each time the pattern is needed, by engraving or milling. This is a time-consuming and costly process. Consequently, very complicated geometries are not often used because of the cost, time and labor involved to mill or engrave such a pattern.

Another method of forming the grooves is by stamping in a stamping press. Stamping the grooves requires using a hard tool containing a protruding pattern of ridges; these ridges, when impressed into an object+c s surface make the impression of grooves on the surface of the object. This process deforms the object, extrudes material above the surface which must then be removed, and introduces stresses in the object which must be relieved by a heat treatment process. Moreover, if a complicated geometry is used, it is expensive even for use in mass production.

The bearing gap between the bearing's surfaces should be uniform, which usually requires that the two surfaces which are separated by the bearing gap conform to each other; that is, the surfaces should "fit" to each other as much as possible in much the same way as an idealized finger should fit into an idealized, perfectly matching glove. The pattern of grooves must be engraved, milled or stamped into the bearing surface each time the fluid bearing is made. After the grooves are created, then the surface of the fluid bearing must be lapped or ground to achieve the desired flat, cylindrical, spherical or conical shape. This is required in order to conform the one surface of the fluid bearing to the other surface. If the bearing face of a flat bearing is wavy or otherwise distorted, then the fluid bearing will not adequately support the load that is placed on it and the dynamics of the bearing will be adversely affected. Lapping is a time- and labor consuming and messy process. Because manufacturing fluid bearings is expensive and time-consuming, they are not widely used although they can be beneficial in many machines that require a smooth, straight, controlled motion, such as in positioning stages used in semiconductor equipment or precision machine tools and coordinate-measuring machines.

FIG. 1 illustrates a prior art flat pad air bearing 100 formed by an air bearing body 102 on top of a guideway 116. The combination of the air bearing body 102 and the guideway 116 forms a fluid bearing assembly. The air bearing body 102 is made of a solid block with opening 114 in its side, which provides the air to an air duct hole 110, then to an outlet hole 108 and finally through an orifice 106. A groove 112 is engraved or milled in the face surface 104, which is the surface of the air bearing body 102 that glides along the guideway 116. Typically, the face surface is lapped to obtain a very flat surface which will conform to another flat surface. A front view of a face surface (e.g., 104) is shown as 200 in FIG. 2. Three orifices 202*a*, 202*b*, 202*c* are shown inserted in the face surface 200. A simple pattern of grooves 204*a–c* has been engraved around each orifice 202*a–c*. A sill 206 is the area outside the grooves 204. Air escaping out of the grooves 204*a–c* and past sill 206 builds up pressure, giving the bearing its load bearing capability.

An example of a prior art radially-shaped fluid bearing is shown in FIG. 3A. The view in FIG. 3A of the fluid bearing is from the bearing face surface 300 that glides on a guideway. A cross-section of the fluid bearing of FIG. 3A is shown in FIG. 3B. Four seats must be prepared for the four orifice inserts 303*a*–303*d* to rest in the bearing body 309 (shown in FIG. 3B). Each orifice insert 303*a–d* is coupled to its respective groove 301*a–d*. Air is provided from the side at 307, typically through a pneumatic fitting (not shown). In FIG. 3B, the orifice may have been too small to drill, so orifice inserts 303*b* and 303*d* that have pre-machined smaller orifices (305*b* and 305*d*) are used. The smaller orifices 305*b* and 305*d* restrict the flow from the air duct 311 to a groove 301*b* and 301*d*, respectively. A better design would utilize fewer orifice inserts. But a more efficient and cost-effective design is not practically feasible in the prior art because of the cost, time and labor involved in milling, engraving or stamping grooves in a bearing surface and in lapping the surface.

While prior art techniques for producing fluid bearings or vacuum chucks have used lapping or grinding to achieve conforming surfaces, in an unrelated field, manufacturers of mirrors have used a process whereby a reflective layer is applied to a mirror substrate in such a way that the reflective layer (or layers) conforms to a flatness master. FIG. 3C shows an example of this process which is used to manufacture a mirror. The process 350 shown in FIG. 3C uses a flatness master 351 to which reflective layer 355 and releasing layer 353 are applied. These layers may be applied by known deposition techniques. The flatness master 351 is carefully lapped or ground to be as flat as possible. A mirror substrate 359 is then coated with adhesive, such as an adhesive layer 357 which is flexible before hardening. The mirror substrate 359 is then pressed against the flatness master 351 such that the adhesive layer 357 contacts the layer 355 and hardens while pressed against the layers. The arrow 361 shows the force applied against the mirror substrate 359. The mirror substrate 359 is removed from the flatness master after the adhesive has hardened (cured) enough such that removing the substrate 359 also removes the layers 353 and 355. Now, the reflective layer 355 remains bonded to the mirror substrate 359 and this layer tends to conform to the surface of the flatness master 359. This process of producing a mirror has not been used in the unrelated field of fabrication of fluid bearings or vacuum chucks.

Thus, a time- and cost-effective method of forming patterns, even those with complex geometries, found in certain fluid bearings and vacuum chucks is desirable. Further, a time and cost effective method of forming an optimally conforming surface for fluid interfaces such as fluid bearings or vacuum chucks is also desirable.

SUMMARY OF THE INVENTION

The present invention provides fluid bearings and vacuum chucks and methods for forming these devices.

An example of a fluid bearing of the present invention includes a plate support and a flexible bearing plate having a bonding surface which is attached to the plate support with an adhesive which is flexible before hardening. The flexible bearing plate conformed to a predetermined surface which was pressed against the flexible bearing plate during at least a portion of a time that the adhesive hardened.

An example of a method for forming a fluid bearing includes forming a plate having a face surface and a bonding surface opposing the face surface. The plate forms one surface of the fluid bearing. The first side of a body is coupled to the bonding surface of the plate, and the face surface of the plate is placed against a predetermined surface and pressure is used to conform the face surface to the predetermined surface.

One particular embodiment of a method for producing a fluid bearing according to the invention comprises the following steps. First, a bearing plate is formed. The bearing plate has a face surface and a bonding surface opposite the bearing face surface. A pattern may be formed on the face surface of the bearing plate. In one embodiment, the pattern may be etched using standard lithographic techniques. Third, an adhesive is applied to bond a first side of a bearing pad body to the bonding surface of the bearing plate.

Unlike the prior art, the bearing pad body and the bearing plate are not required to have a perfect surface figure at this point in the process. The face surface of the bearing plate is then placed against a flatness master or some other predetermined surface which is designed to conform or model the other surface which opposes the face surface when the fluid bearing is assembled. In one embodiment, the predetermined surface may be the other surface, such as a guideway. A pressure difference between the bonding surface and the face surface of the bearing plate is provided until the face surface replicates or conforms to the shape of the flatness master or the other predetermined surface. The pressure difference may be caused by greater pressure at the bonding surface than at the face surface. For example, the bonding surface can be at atmospheric pressure and the face surface can be at vacuum. Or the bonding surface has a pressure greater than atmospheric pressure and the face surface is at atmosphere or at vacuum. Thus, flatness of the bearing plate and formation of a fluid bearing, in one embodiment, are achieved without the messy and time-consuming process of lapping.

The present invention also teaches methods to form a vacuum chuck or a guideway. Other aspects of the present invention are described below.

BRIEF DESCRIPTION OF THE DRAWINGS

The present invention will be understood more fully from the detailed description given below and from the accompanying drawings of the invention. The detailed description and drawings should not be taken to limit the invention to the specific embodiment shown, but are for explanation and understanding only. In addition, for clarity and because the drawings are meant to be illustrative, all the elements of a figure are not always drawn to scale and relative dimensions of various elements are not shown.

DETAILED DESCRIPTION

The present invention relates to fluid bearings, vacuum chucks, and other devices and methods for producing these items. In the following description, numerous specific details are given to provide a thorough understanding of the invention. It will be apparent, however, to one skilled in the art that the invention may be practiced without these specific details. Moreover, in some instances, well-known equipment and processes have not been set forth in detail in order not to unnecessarily obscure the present invention.

Figure 4A:
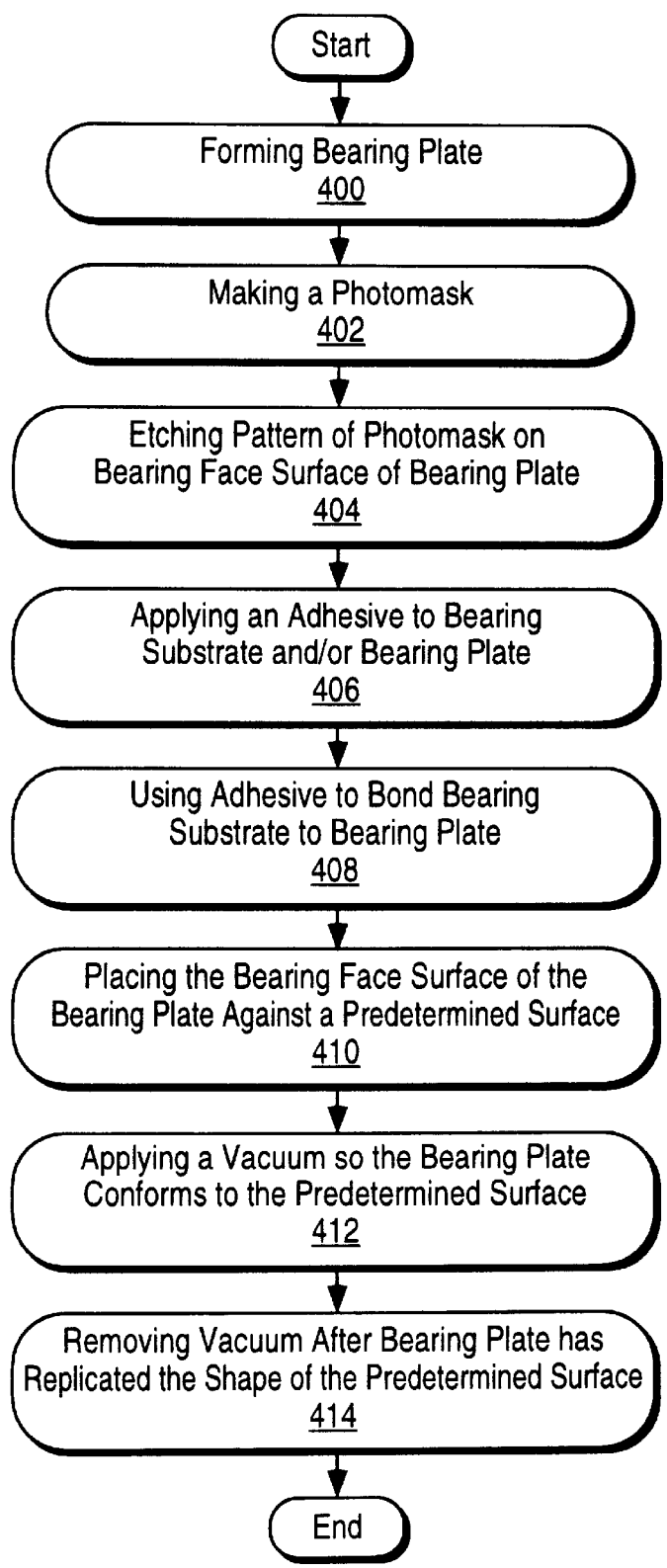
FIG. 4A is a flow chart illustrating one embodiment of the present invention.

FIG. 4A is a flow chart illustrating one embodiment of the present invention for creating a fluid bearing or a vacuum chuck. Fluid bearings can be used to support various loads, such as a stage moving along a guideway in a wafer-processing chamber. A vacuum chuck may be used to hold objects as is known in the prior art. In step 400, a bearing plate is formed; it may be formed out of any flexible material that may be etched (although the flexibility and/or etchability may not be required for all embodiments of the invention). The bearing plate can, using one aspect of the invention, be easily patterned, regardless of a pattern's complexity. For example, if the plate is a metal or metal alloy, in one embodiment, standard photolithography, instead of engraving, milling or stamping, can be used to etch a pattern on the bearing plate. Engraving, milling or stamping may be used rather than etching. In one embodiment, the bearing plate comprises of a material selected from a group consisting of stainless steel, bronze, brass, aluminum and their respective alloys, and ceramic and glass. It will be appreciated that the bearing plate can be formed out of other materials in which a pattern can be formed. The applicable shapes for this plate include but are not limited to flat, conical and cylindrical bearing pads. The conical and cylindrical surfaces can be made from flat-thin sheet material and subsequently formed to either a conical or cylindrical shape.

Figure 5A:
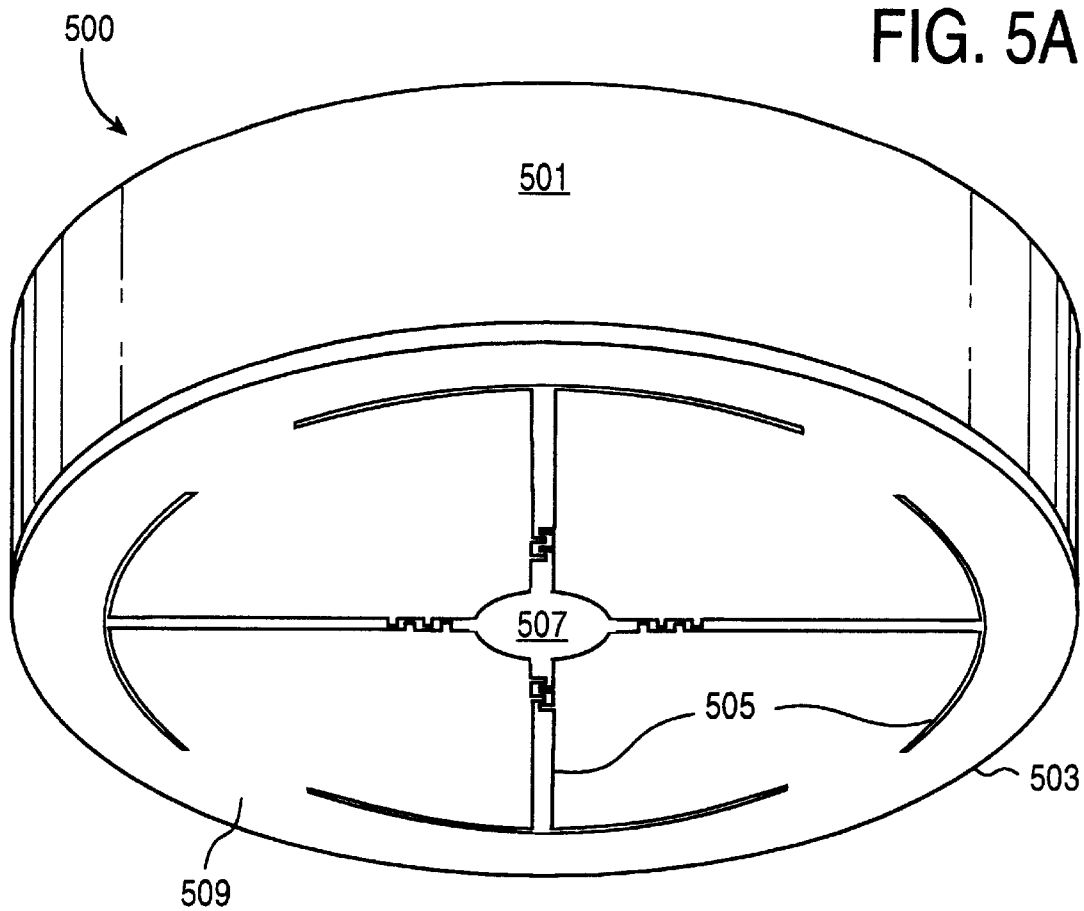
FIG. 5A illustrates a fluid bearing formed using the present invention.
Figure 5B:
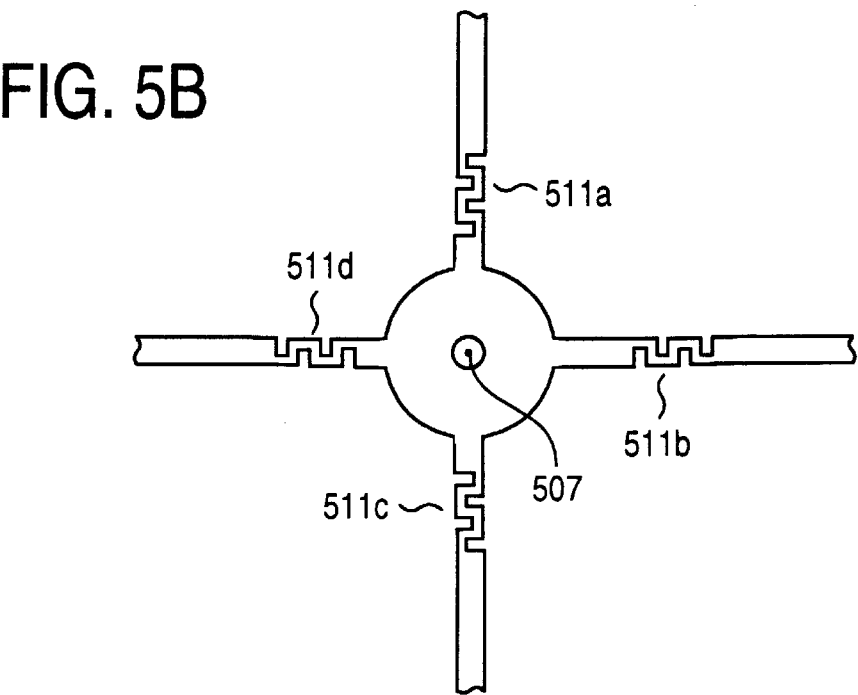
FIG. 5B illustrates a detailed view of part of the bearing face surface of the fluid bearing of FIG. 5A.

In step 402, a photomask with the desired pattern is made when the bearing plate is made of material that can be etched. The photomask (or etching screen) is typically made by coating the bearing face surface with a photoresist material, exposing the material to light through a mask which has the desired pattern and developing the photoresist material to expose areas to be etched on the bearing face surface. Typically, the exposed areas form the desired pattern. This pattern may consist of a plurality of grooves on the bearing face surface, which is the surface of the bearing plate that moves along a guideway surface or other surface which faces the bearing plate and is separated from the bearing plate by the fluid film in the gap between the surfaces of the fluid bearing. Or the pattern that is to be etched may comprise a plurality of grooves, orifices and surface restrictors. An etched surface restrictor 511a which is coupled to grooves and an orifice is illustrated in FIG. 5B. The outer shape of the bearing plate may be formed by etching through the entire thickness of the material of which the plate is made. The grooves in the face surface of the bearing plate (such as grooves 505 as shown in FIG. 5A) may be etched partially into the thickness of the plate. The grooves serve as fluid flow channels to evenly distribute the fluid pressure along the face surface of the bearing plate. The depth and width of the grooves may be controlled to obtain desired flow characteristics of the fluid. The orifices (such as orifice 507 as shown in FIG. 5A) are formed by further etching (or drilling) selected spots within the groove pattern all the way through the thickness of the bearing plate. The orifices may be etched (or otherwise created) either from the same side as the grooves, or from the opposite side (the bonding surface side of the bearing plate), until the through hole is fully formed. The orifice etching process, if etching is used, is controlled to obtain a desired orifice size. The orifice size determines the fluid flow and is usually critical to controlling the bearing's characteristics. The bonding surface of the bearing plate may also be partially etched to enhance adhesion when the plate is bonded to the bearing substrate.

Using standard photolithography techniques, the pattern can be etched onto the bearing face surface of the bearing plate in step 404. The pattern is etched (or sandblasted in some cases) into the exposed areas formed by the developed photoresist. After etching, the developed photoresist is removed. It will be appreciated that etching or sandblasting may be considered as eroding the surface; thus, the term eroding will refer to either etching or sandblasting. The complexity of the pattern does not significantly affect photolithography costs. Moreover, the pattern embodied in a photomask may be reused in subsequent etches. Unlike the prior art, the pattern does not need to be tediously recreated each time it is used. Thus, complex patterns may be cost-effectively utilized under the present inventive method.

In step 406, an adhesive is applied to the bearing substrate and/or to a bonding surface of the bearing plate. The bearing substrate is also referred to as a plate support or a body. The bonding surface is opposite the bearing face surface of the bearing plate. In one embodiment, the adhesive used is an epoxy with a viscosity at room temperature from about 10,000 centipoise to about 400,000 centipoise. The adhesive is carefully chosen and placed so that it does not block any of the orifices or grooves in the bearing substrate or the bearing plate to ensure continuous fluid flow between the bearing's surfaces when the bearing is assembled. If fluid flow is blocked or hindered, then an inconsistent fluid bearing film is formed, and the performance of the fluid bearing is degraded. Enlarged grooves or openings may be created around orifices in the bearing substrate in order to prevent the adhesive from clogging these orifices; enlarged opening 621a of FIG. 6B is an example of an enlarged opening around an orifice in the bearing substrate 608. Seals between the orifices and bearing body or bearing plate may be used to prevent blocking by the adhesive of the orifices.

In step 408, the adhesive is used to bond the bearing substrate to the bearing plate. The bearing face surface of the bearing plate is then placed against a predetermined surface in step 410 while the adhesive has not yet fully hardened. In one embodiment, the predetermined surface is a flatness master which is a tool that helps make the bearing plate achieve a smooth, flat bearing face surface so that the bearing plate glides evenly on a guideway surface. The predetermined surface is designed to model the surface shape, as nearly as desired, of the guideway or other surface which, together with the bearing plate, forms the fluid bearing. The flatness master can be a block of granite or an optical flat in one embodiment. In another embodiment, the guideway itself (rather than a shape representing the guideway) can be used as the predetermined surface.

In step 412, while the adhesive is hardening (or before hardening begins) a vacuum is applied between the bearing plate and the predetermined surface so that the bearing plate conforms to the predetermined surface or replicates the shape of the flatness master. It is to be appreciated that in another embodiment, pressure may be applied to press the bearing plate to the predetermined surface until the bearing face surface replicates the shape of the predetermined surface which the adhesive is hardening or curing. For example, the bonding surface could have a pressure greater than atmospheric pressure and the face surface could be at atmosphere or at vacuum. It will be appreciated that other ways of exerting pressure may be used.

The shape of the predetermined surface is determined by the desired shape for the fluid bearing plate. For example, a round journal bearing requires a rounded predetermined surface. The predetermined surface may be used to achieve a flat rectangular-shaped fluid bearing that moves in only two dimensions or a radial-journal bearing that allows rotational and vertical movements, if desired. In one embodiment, vacuum or a pressure differential can be provided to the bearing plate through the bearing pad or through the predetermined surface. Thus, a highly conforming bearing face surface on the bearing plate (which conforms well to the guideway or other surface of the fluid bearing) is achieved without using the messy and time-consuming process of lapping. Consequently, manufacturing costs are lower and productivity increases.

Figure 4B:
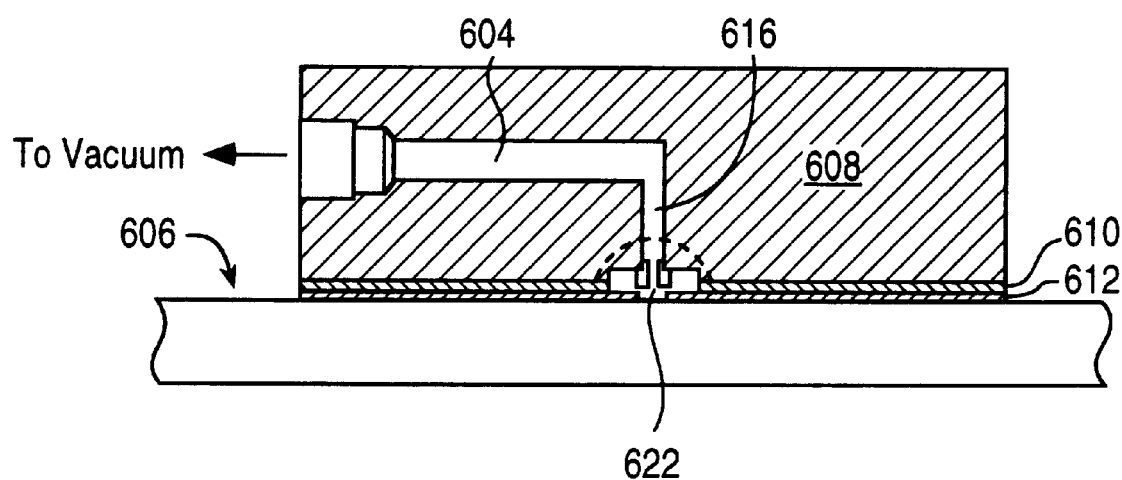
FIG. 4B shows a bearing plate being formed according to the process of FIG. 4A.

FIG. 4B shows a cross-sectional view of a bearing plate 612 which is being pressed against a predetermined surface 606 while the adhesive 610 hardens between the bonding surface of the bearing plate 612 and the bottom surface of the bearing substrate 608. The pressure is caused by a vacuum which is pulled through the air duct 604 and duct 616 and the orifice 622; this vacuum sucks the flexible bearing plate 612 against the predetermined surface 606.

In step 414, the vacuum is removed after the bearing plate has replicated the shape of the flatness master. This is typically after the adhesive has hardened or cured sufficiently. In some cases, a little lapping may be used on the bearing face surface to achieve an even greater degree of smoothness on the surface.

A perspective view of another fluid bearing formed according to one embodiment of the present invention is illustrated in FIG. 5A. Referring to FIG. 5A, an assembled air bearing 500 is shown. The air bearing 500 comprises a bearing substrate 501 and a bearing plate 503 with its bearing face surface. Bearing plate 503 is bonded to the bearing substrate 501 using an adhesive (not shown). In one embodiment, the adhesive used is an epoxy with a viscosity at room temperature from about 10,000–400,000 centipoise. The adhesive must be strong enough to bond the bearing pad 501 and the bearing plate 503 together, but not so runny (thin) that it blocks any openings, such as orifice 507. A central orifice 507 may be drilled or etched through the plate 503 and is coupled to four grooves 505 which may be etched on the face surface of plate 503. In one embodiment, the diameter of the orifice may range from about 0.001 inch to about 0.010 inch. A sill 509 is the area outside the pattern of grooves 505. The grooves 505 on the periphery of the air bearing are often hair-thin and, in one embodiment, have a width of about 0.010 inch.

Figure 3A:
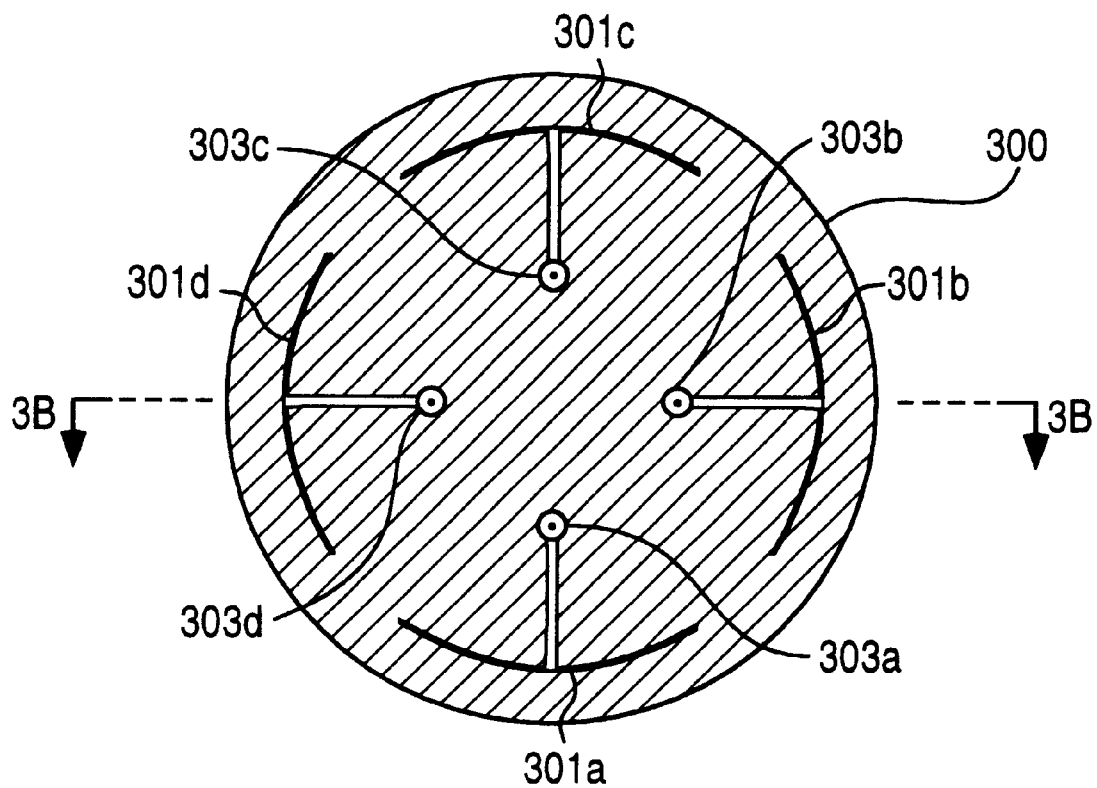
FIG. 3A illustrates a prior art radially-shaped fluid bearing surface.
Figure 3B:
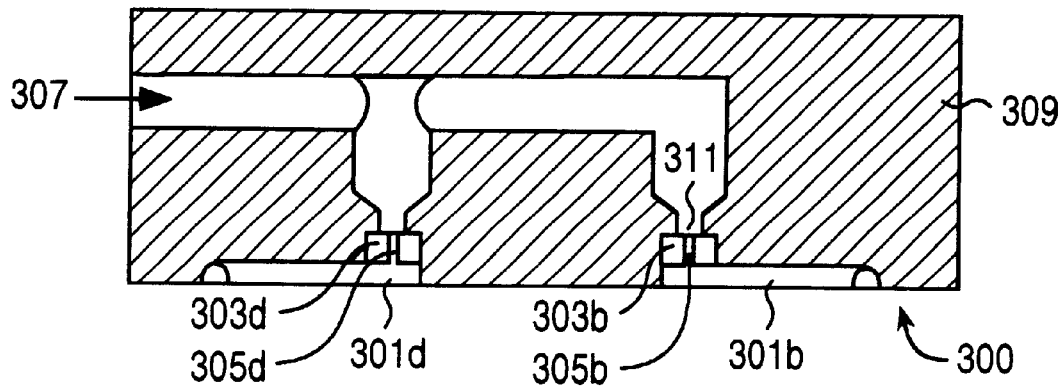
FIG. 3B illustrates a cross-section of FIG. 3A.
Figure 3C:
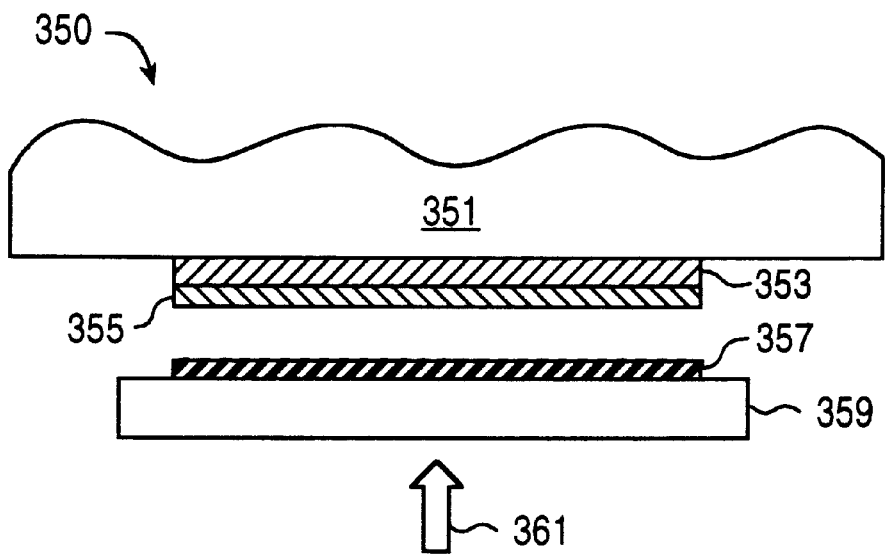
FIG. 3C shows a prior art process for fabricating a mirror.

An exploded view of a portion of the groove 505 surrounding the orifice 507 is shown in FIG. 5B. In one embodiment, an etched surface restrictor, such as 511a, is used to slowly decrease the pressure of the air incrementally as it flows through the grooves 505 to achieve an even pressure distribution throughout the air bearing 500. The surface restrictor may be etched onto the face surface of the bearing plate 503. It is to be appreciated that different patterns of an etched surface restrictor may be used to restrict (or slow) the flow of air through a groove 505. In addition, each of the surface restrictors may have a different pattern. The pattern of one orifice 507 and four etched surface restrictors 511a–d is more time- and cost-effective to manufacture than the prior art bearing of FIG. 3A. Furthermore, the pattern illustrated in FIGS. 5A–B could not have been easily and cost-effectively created in the prior art. It will be appreciated that air bearing 500 may be used as a vacuum chuck by drawing a vacuum through the orifice 507. In this manner, an object which is placed onto the surface of the bearing plate 503 will be sucked toward the face surface of the plate 503, thereby holding the object. One use of such a vacuum chuck may be a semiconductor wafer holding platform, such as the platforms used in wafer probers manufactured by Electroglas of Santa Clara, Calif. The fluid bearings and vacuum chucks of the present invention may be used in a variety of wafer processing operations, including wafer inspecting, wafer probing, and wafer coating.

Figure 6A:
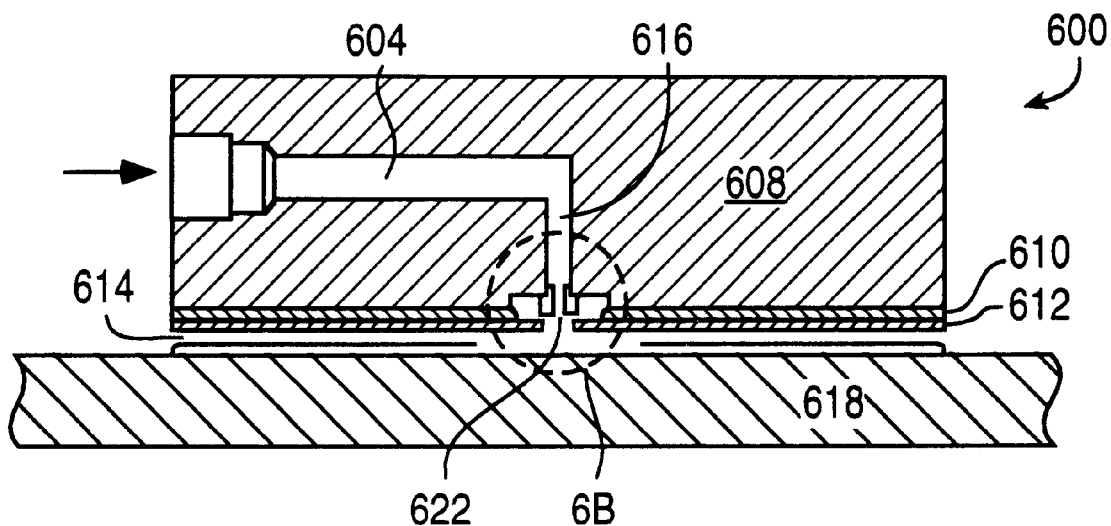
FIG. 6A illustrates a cross-section of an air bearing formed using the present invention.
Figure 6B:
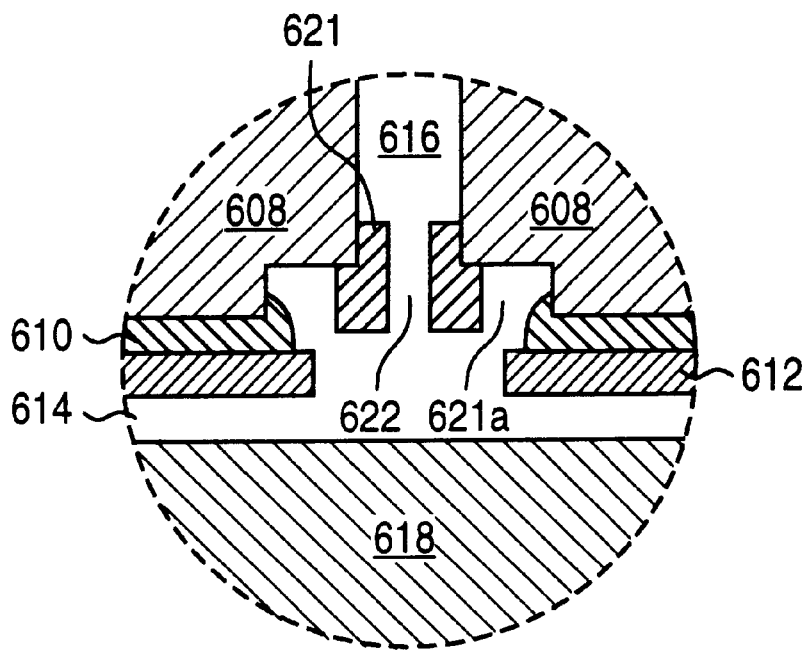
FIG. 6B shows an enlarged view of part of the air bearing of FIG. 6A.

Referring to FIG. 6A, a cross-section of a fluid bearing 600 formed according to one embodiment of the present inventive method is illustrated. Unlike prior art fluid bearings, fluid bearing 600 has two components: a bearing substrate or body 608 and a bearing plate 612. An adhesive 610, such as epoxy, is placed between the bearing pad body 608 and the bearing plate 612 in order to bond the two parts together. A load may be placed on the top of the bearing body 608. The load can be, for example, a motor or a wafer stage. A pneumatic fitting is typically connected to an air duct hole 604, which is coupled to an outlet hole 616 and orifice 622, which is visible in the enlarged view of FIG. 6B. It is to be appreciated that in other embodiments, a pneumatic inlet may be placed in other locations.

Figure 6C:
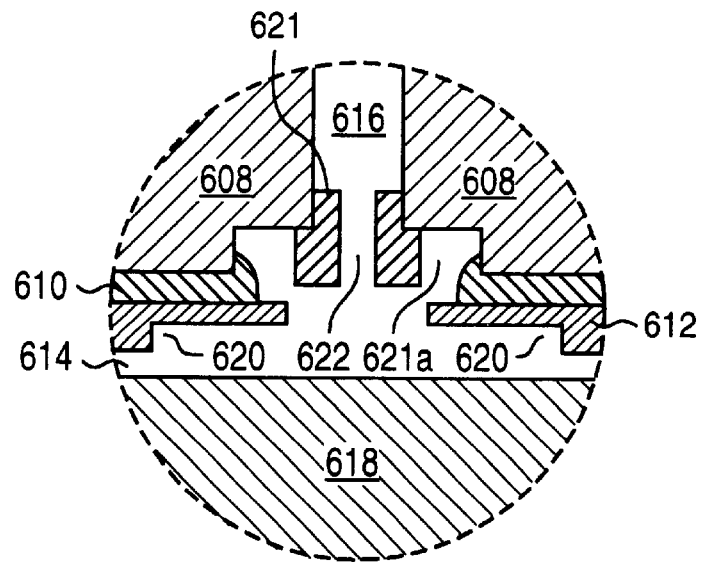
FIG. 6C illustrates a cross-section of an air bearing of the present invention.

FIG. 6B illustrates an enlarged view of part of FIG. 6A. The fluid bearing film 614 created by a fluid (e.g., liquid or gas) which is present in the bearing gap allows one surface (e.g. the bearing plate's surface) to slide or glide across the guideway surface 618. This results in tremendous energy savings. For example, a 4"×6" fluid bearing may support and move a load of about 400 pounds. The diameter of the outlet hole 616 is usually larger than the diameter of the orifice 622 in a fluid bearing. The viscosity of the adhesive 610 is chosen so that the adhesive does not block the fluid flow through the outlet hole 616 or the orifice 622. The enlarged opening 621a around the nozzle 621 helps to assure that the adhesive does not block the fluid flow through the nozzle 621 and the orifice 622. Unhindered fluid flow through a fluid bearing is crucial for even fluid bearing film 614 distribution. A groove 620 can be formed in the bearing plate 612. FIG. 6B shows one cross-sectional view of the area around the orifice 622 where no grooves exist in the face surface of the bearing plate 612, and FIG. 6C shows another cross-sectional view through the area around the orifice (but taken at a different angle). In the case of FIG. 6C, grooves 620 run along the face surface of the bearing plate 612. It is to be appreciated that any pattern of grooves and/or orifices can be formed in the bearing plate 612. Orifice 622 may be formed by drilling or etching. It may also be an inserted commercial orifice which is placed into an opening. The fluid bearing film 614 flows along grooves 620 in order to achieve an even pressure distribution throughout the bearing face surface of the bearing plate 612. If the pressure distribution is uneven, then the fluid bearing 600 will not glide without contacting the guideway surface 618. This may damage the guideway and may also adversely affect the load supported by the fluid bearing 600.

In the prior art, since the fluid bearing was made from one block, a very long hole was drilled from the top side of the block or substrate body to the face surface (or bottom side). The alternative is to machine-mill a manifold, which is a system of grooves, onto the face side of the pad body (i.e., the side that glides on the guideway). These prior art techniques are disadvantageous. In contrast, in one embodiment, the manifold may be milled in the substrate's surface 608 that will then mate with the bearing plate 612. The pattern of grooves in the manifold ducts or conducts air from a single point, where a pneumatic fitting is located in the substrate, to all the points, where orifices are located in the bearing plate. A preferred pattern of grooves for the manifold conducts an equal and maximum amount of air to all the orifices in the bearing face surface of the bearing plate 612.

In one embodiment, the bearing plate 612 covers the manifold that has been formed in the bearing substrate 608. When vacuum is applied to the bearing substrate 608 and the bearing plate 612, the vacuum is distributed by the manifold in the bearing pad body 608 to all the orifices in the bearing plate 612 and then to the grooves 620. Therefore, the bearing plate 612 is forced against the predetermined surface. As a result, the bearing plate 612 conforms to the shape of the predetermined surface. A bearing plate 612 which conforms well to the other surface of the fluid bearing allows the fluid bearing film 614 to be uniformly distributed across the bearing face surface of the bearing plate 612. This is very important so that the fluid bearing 600 does not drag on low spots and so that excess air does not escape through the high spots on a guideway surface or on the fluid bearing. The fluid bearing film 614 should be evenly and uniformly distributed for the air bearing to move smoothly along the guideway 618.

Another advantage of the present invention is the ability to flatten or otherwise shape a bearing plate much faster and cheaper than with lapping, which is a very time-consuming and expensive process. To accomplish this, the bearing plate must be made of a material that is fairly compliant so that the bearing plate can conform to the predetermined surface. In addition, the present invention allows any complexity of grooves to be formed on the bearing plate by using conventional photolithographic etching technology. Moreover, a groove pattern may be designed to evenly distribute pressure on the bearing pad body 608. Or if an uneven load is placed on the bearing pad body 608, the pressure distribution can reflect that unevenness, and yet achieve a balanced fluid bearing film using a particular groove pattern. Thus, a pattern of grooves may be formed into the bearing plate 612 to form an even bearing fluid film 614 although the load, supported by the fluid bearing 600, is unevenly distributed.

In one embodiment, the pattern of grooves may be etched using standard lithographic techniques instead of the prior art method of slowly engraving, milling or stamping each individual groove and orifice in a pattern each and every time. Moreover, stamping of a pattern onto a surface often creates many concentrated stresses on the surface. As a result, stress relief often had to be performed on the surface. Consequently, the pad body of a prior art fluid bearing is often extensively lapped in order to get rid of unwanted bumps or ridges formed during the stamping process and to produce the desired flatness. The present method does not create unwanted bumps that require subsequent stress relief of the fluid bearing. This results in a faster manufacturing process and increased productivity.

Figure 6D:
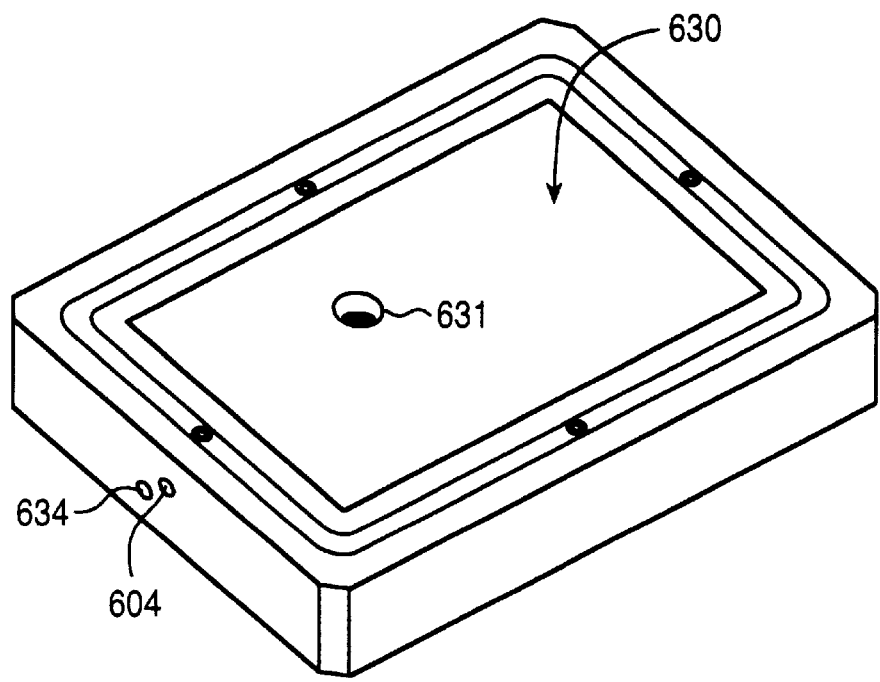
FIG. 6D shows a perspective view of another embodiment of an air bearing of the present invention which also includes a vacuum preload.
Figure 6E:
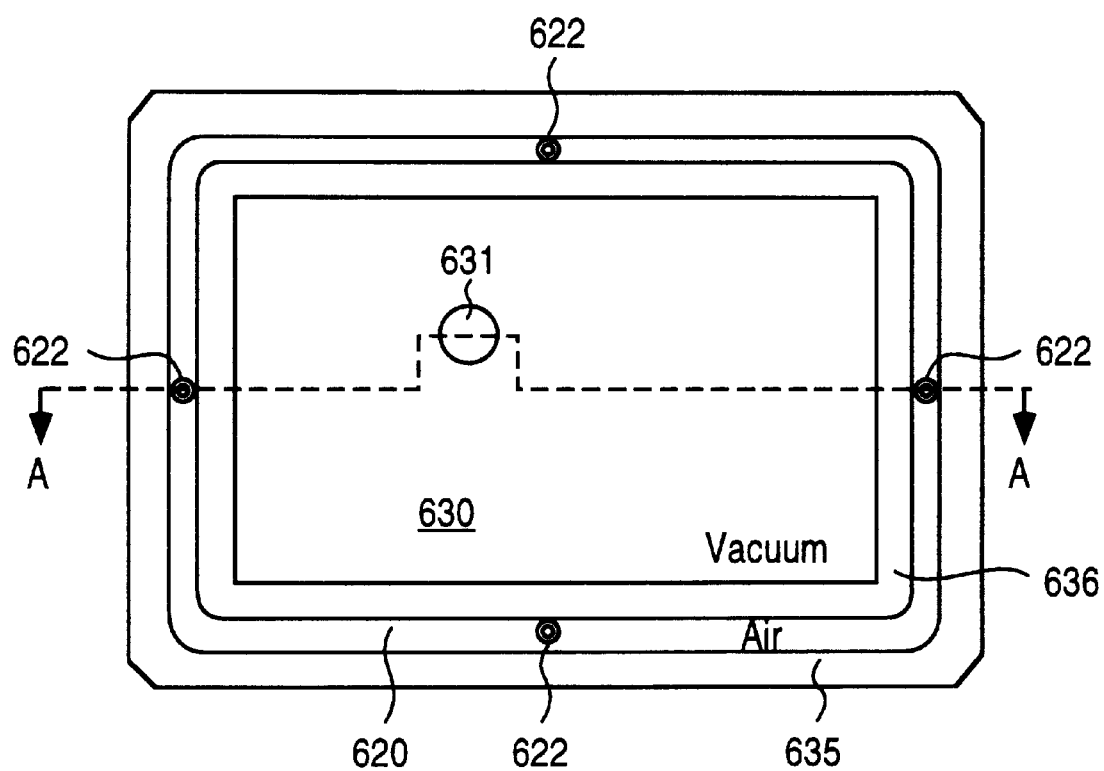
FIG. 6E shows a bottom view of the bearing face surface of the air bearing of FIG. 6D.

FIG. 6D shows a perspective view of another embodiment of an air bearing of the present invention which also includes a vacuum preload capability. This air bearing has on its bearing face surface a vacuum recess 630 which is in fluid communication with a vacuum hole 631 which itself is in fluid communication with a vacuum duct hole 634. The vacuum duct hole 634 is coupled to a vacuum source to pull a vacuum through the vacuum hole 631 such that a vacuum is generated in the vacuum recess 630 on the bearing face surface of this air bearing. FIG. 6E shows a bottom view of the bearing face surface of this air bearing. The face surface includes the recess 630 and a groove 620 which is near the perimeter of the face surface. The groove 620 includes four orifices 622 which are coupled to the air duct 604 to provide air to the face surface in order to provide an air bearing. The recess 630 is recessed relative to outer sill 635 and inner sill 636. The air bearing of FIG. 6E may be used in a number of different ways. In one way, the air duct 604 provides air to the orifices 622 to allow the bearing to "fly" on an air film over a guideway, and at the same time, the vacuum recess 630 creates a vacuum as the vacuum duct hole 634 pulls a vacuum. In this way, the air bearing is preloaded by the vacuum so that the air bearing is relatively still as it glides over a guideway. In another way, the air bearing may use the air source separately from the vacuum source. In this alternative, the air bearing moves less stiffly over a guideway as the vacuum circuit is not on when the air circuit is providing air for the air bearing. The air source may be turned off to stop air flowing through the orifices, and then the vacuum source may be turned on to create a vacuum in the vacuum recess thereby clamping the baring to the guideway so that it cannot move. The vacuum source may be turned off and the air circuit turned on again to allow the air bearing to move.

Figure 6F:
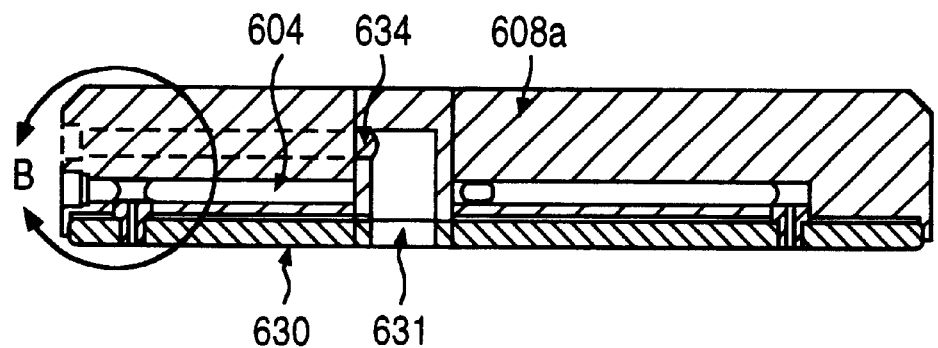
FIG. 6F shows a cross-sectional view of the air bearing of FIG. 6E, which view is taken along the line A—A shown in FIG. 6E.
Figure 6G:
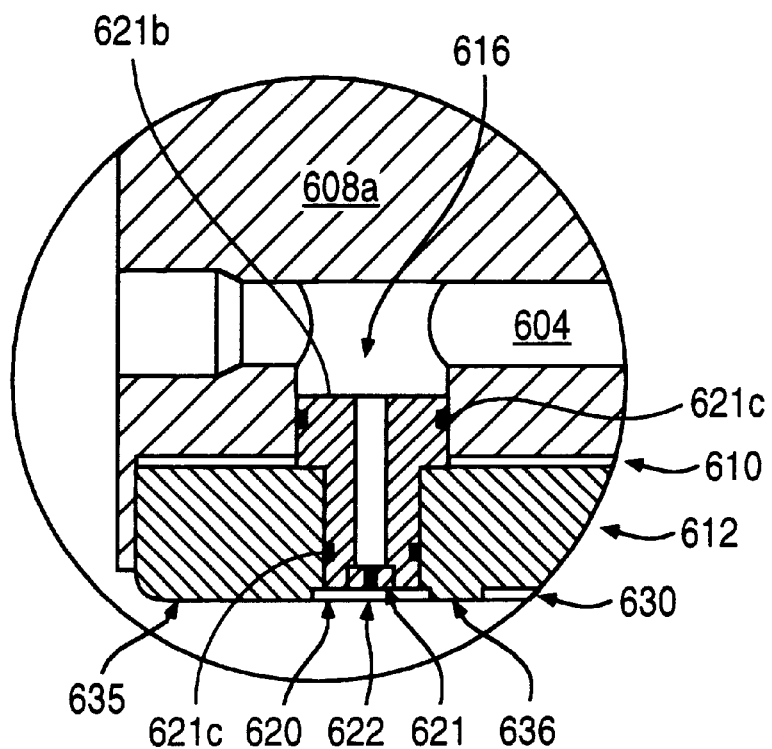
FIG. 6G shows an enlarged cross-sectional view of a portion of the air bearing of FIG. 6F the portion is shown by the circle B in FIG. 6F.

FIG. 6F shows a cross-sectional view of the bearing represented by FIG. 6E, where the cross-sectional view is taken along the line A—A shown in FIG. 6E. As can be seen from FIG. 6F, the vacuum duct hole 634 couples the vacuum hole 631 to a vacuum source in order to generate a vacuum in the recess 630. The air duct 604 is coupled to an air source to create the fluid film below the face surface in order to allow the air bearing to ride over a guideway. FIG. 6G shows an enlarged cross-sectional view of a portion of the air bearing of FIG. 6F, where the portion is shown by the circle B in FIG. 6F. As can be seen from FIG. 6G, the air bearing includes a seal 621b which has been inserted into the body 608a and which is also inserted in a hole in the bearing plate 612. Two O-rings, 621c are placed around the seal 621b. The seal 621b serves to prevent the adhesive 610 from blocking the outlet hole 616 or the orifice 622 or the nozzle 621.

Figure 6H:
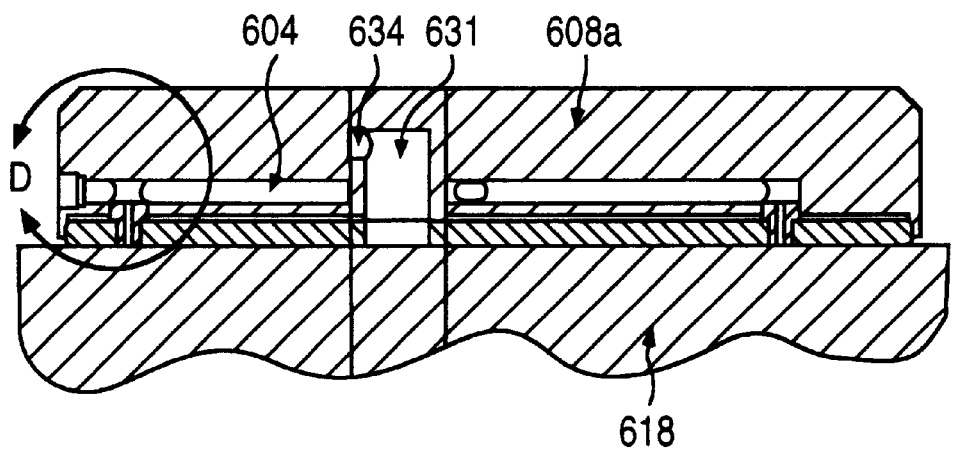
FIG. 6H shows a cross-sectional view of another embodiment of an air bearing of the present invention on a guideway surface 618.
Figure 6I:
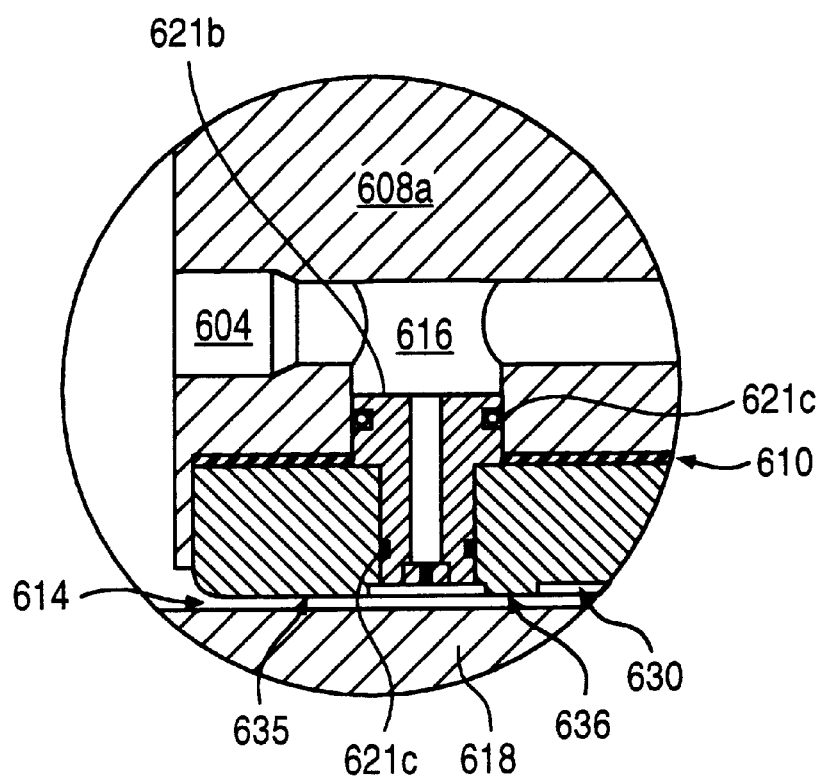
FIG. 6I shows an enlarged cross-sectional view of a portion of the air bearing of FIG. 6H; the portion is shown by the circle D in FIG. 6H.

FIG. 6H shows a cross-sectional view of another embodiment of an air bearing of the present invention on a guideway surface 618. FIG. 6I shows an enlarged cross-sectional view of a portion of the air bearing of FIG. 6H. The portion shown in FIG. 6I is indicated by the circle D shown in FIG. 6H. The seal 621b is placed into an opening in the body 608, which opening is typically a cylindrical hole, and the seal 621b is also placed through a cylindrical opening in the bearing plate 612. This seal 621b is coupled to two O-rings 621c. The O-rings and the seal prevent the adhesive 610 from leaking into the communicative orifices such as outlet hole 616.

Figure 6J:
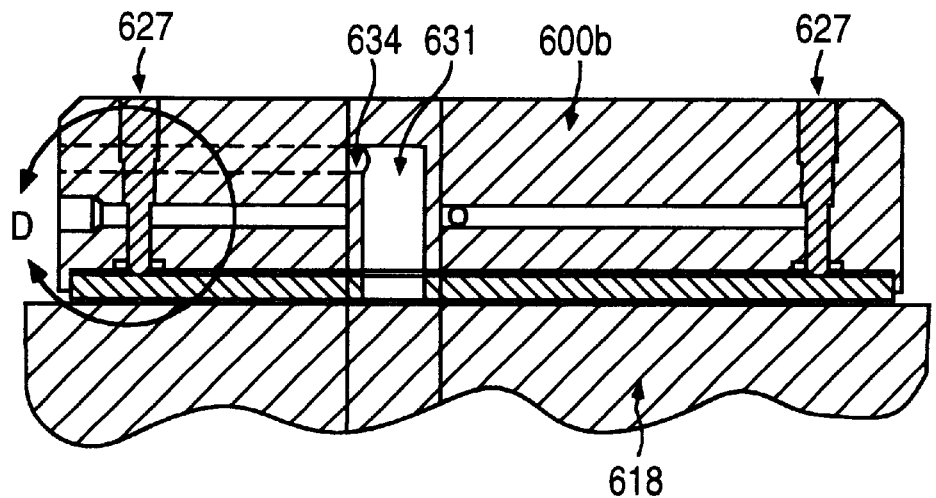
FIG. 6J shows a cross-sectional view of another embodiment of an air bearing of the present invention.
Figure 6K:
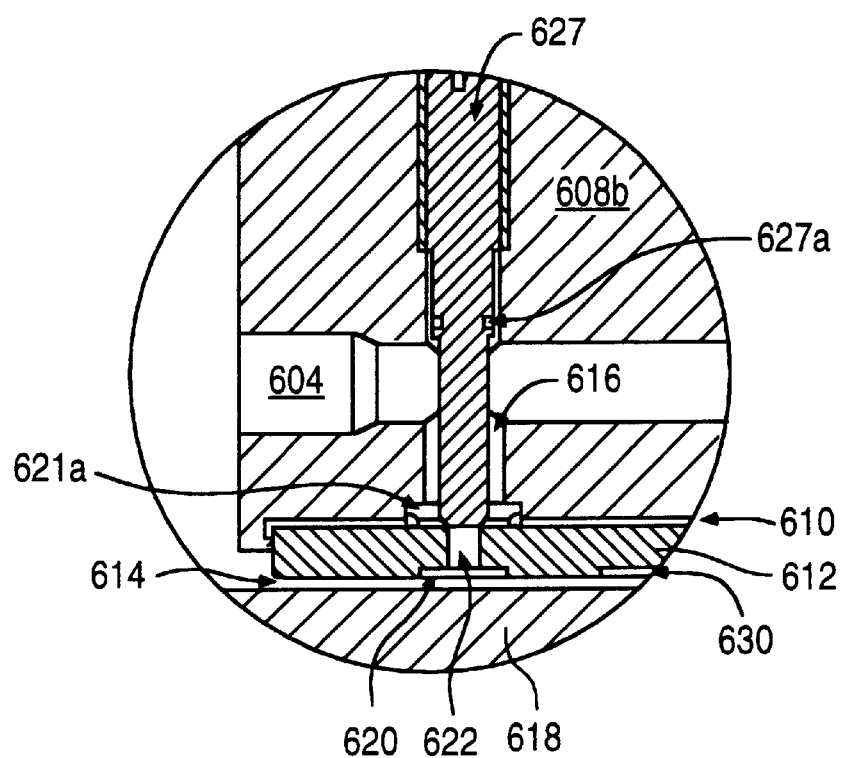
FIG. 6K shows an enlarged cross-sectional view of a portion of the air bearing of FIG. 6J, where the portion is shown by the circle D in FIG. 6J.

FIG. 6J shows a cross-sectional view of another embodiment of an air bearing of the present invention. In this embodiment, the air bearing includes an adjustment screw 627. This adjustment screw may be used to restrict the flow and to control the flow of fluid through the air bearing by screwing the screw up or down. FIG. 6K shows an enlarged cross-sectional view of a portion of the air bearing of FIG. 6J.

Figure 1:
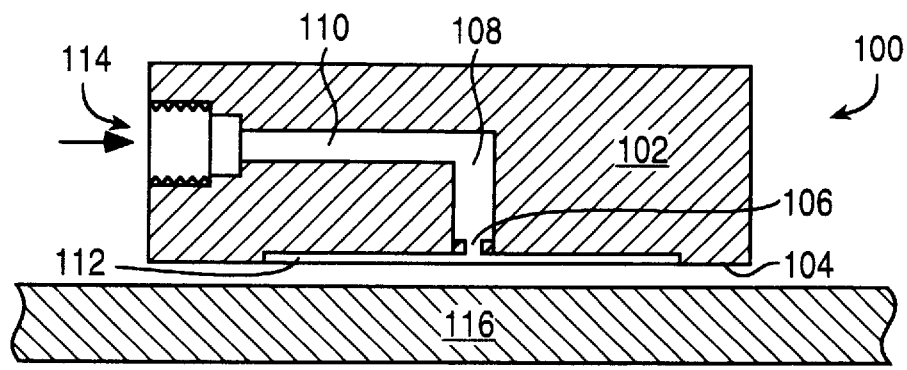
FIG. 1 illustrates a prior art air bearing which is a type of a fluid bearing.
Figure 2:
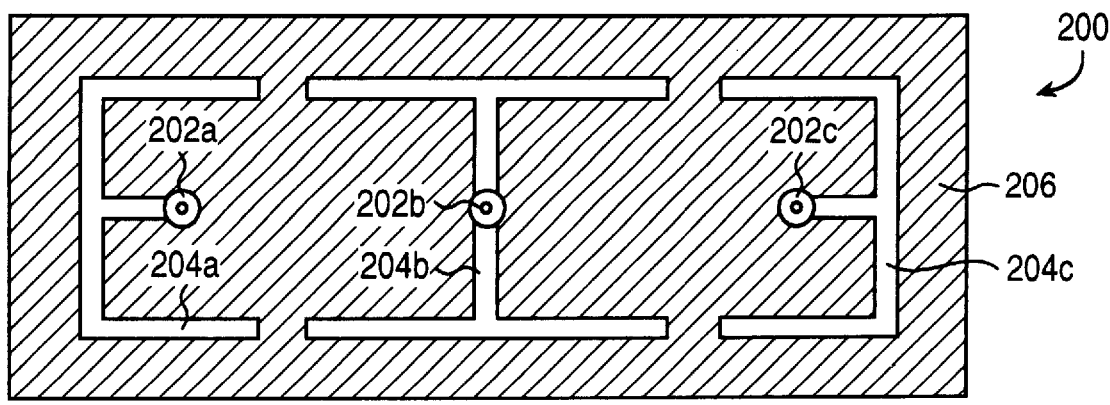
FIG. 2 illustrates a front view of a prior art bearing face surface.
Figure 7:
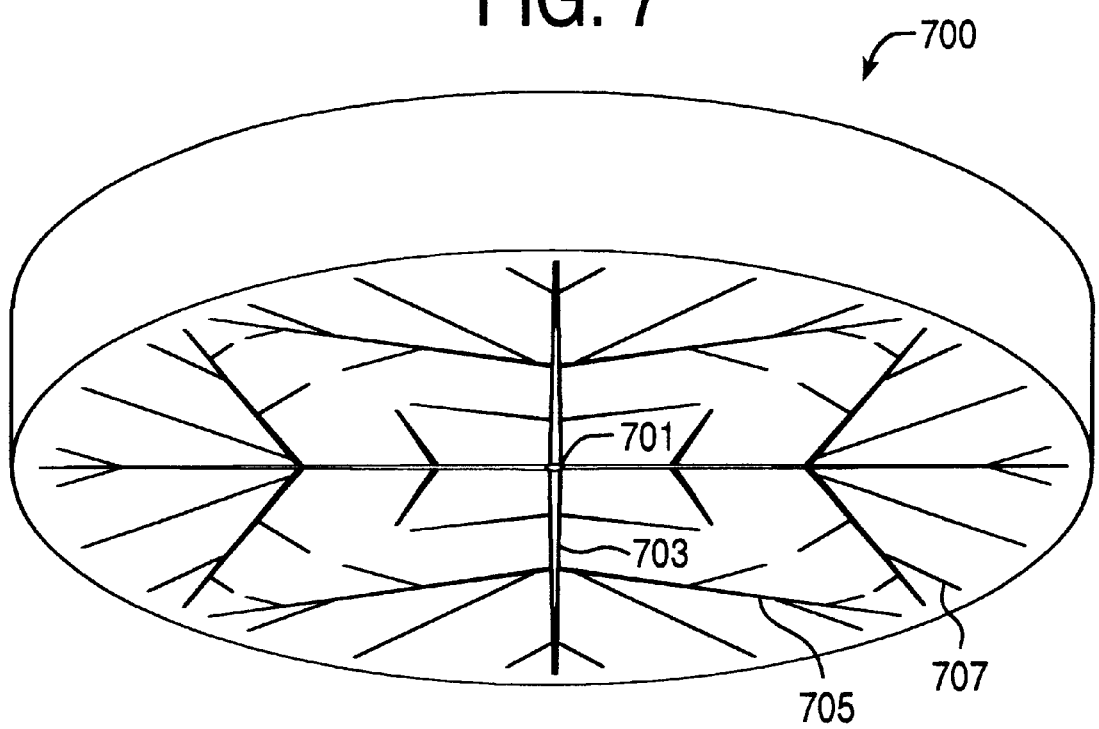
FIG. 7 illustrates a perspective view of a complex leaf geometry that may be etched on a bearing face surface using the present invention.

FIG. 7 is a perspective view that illustrates one embodiment of a bearing face surface of a bearing plate for a fluid bearing. The bearing face surface 700 glides along a guideway. The bearing face surface 700 illustrates a complex geometry that can be easily obtained and repeated using the present invention. The leaf pattern emanates from orifice 701 and then branches off into groove 703, which then branches off into a smaller groove 705 and still yet a smaller groove 707. Air can be evenly and gradually distributed utilizing this leaf pattern. This etched leaf pattern of grooves (703, 705, 707) supplies air evenly to every point of the bearing plate except for the sill. This invention allows the creation of much finer groove geometries than seen in the prior art, such as shown in FIG. 2, and that distribute fluid more evenly than prior art geometries. The result is a fluid bearing with a better load-carrying capacity than that of the prior art fluid bearings.

The bearing plate design of FIG. 7 is pneumatically equivalent to a prior art air bearing pad with a recess for a ceramic or porous carbon insert. The prior art ceramic or porous carbon bearing did not have grooves. Instead, the air is pushed through the entire insert, which is often made of ceramic or porous carbon. One disadvantage of this prior art air bearing is that the ceramic or porous carbon insert is often too porous resulting in excess air flowing through the air bearing. To achieve a prescribed low flow into the bearing, a time-consuming process of adjusting the porosity by impregnation with lacquers and solvents is used. In order to hold the flatness of the porous facing, a complex rib structure is machined in the pad body, and the porous facing is then bonded to the ribs to maintain its structural integrity. The resulting pad is then lapped flat and the flow adjustment using lacquer and solvent is performed.

This porosity problem does not occur with the leaf pattern bearing of FIG. 7 because the grooves (or veins) in the leaf pattern can be easily varied (through control of the photolithographic and etching process) to ensure even air distribution. Moreover, ceramic pads are very expensive. In sharp contrast, the cost of forming the leaf pattern onto a material that can be etched, such as stainless steel, is considerably cheaper. Thus, aspects of the present invention may be used to achieve much finer groove geometries for a more even fluid distribution on a fluid bearing at a significantly lower manufacturing cost.

Figure 8A:
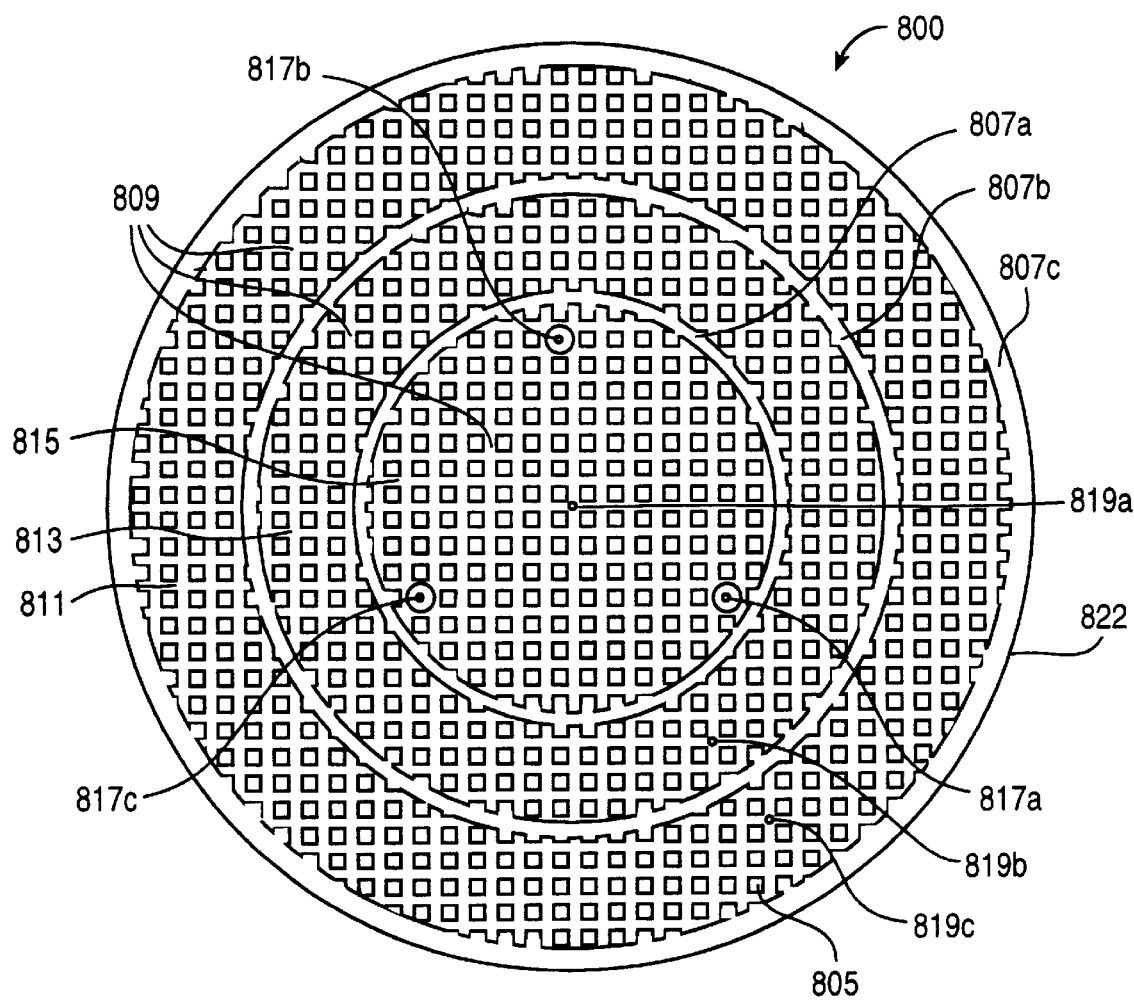
FIG. 8A illustrates a top view of a vacuum chuck that was formed using the present invention.

FIG. 8A illustrates a top view of a vacuum chuck that was manufactured using one embodiment of the present inventive method. The vacuum chuck 800 of FIG. 8A is similar to the vacuum chuck of FIG. 9, except without a recess for a robotic arm or slider 903. The plate 822 has three radial rims, 807a–c, and three sectors 815, 813 and 811 defined by these rims respectively, that support wafers that are four-inches, six-inches, and eight-inches in diameter, respectively. In addition, there is an etched pattern of pillars 805 within each concentric sector 811, 813 and 815, respectively. It is to be appreciated that other patterns can also be formed and designed and they need not be etched.

Figure 8B:
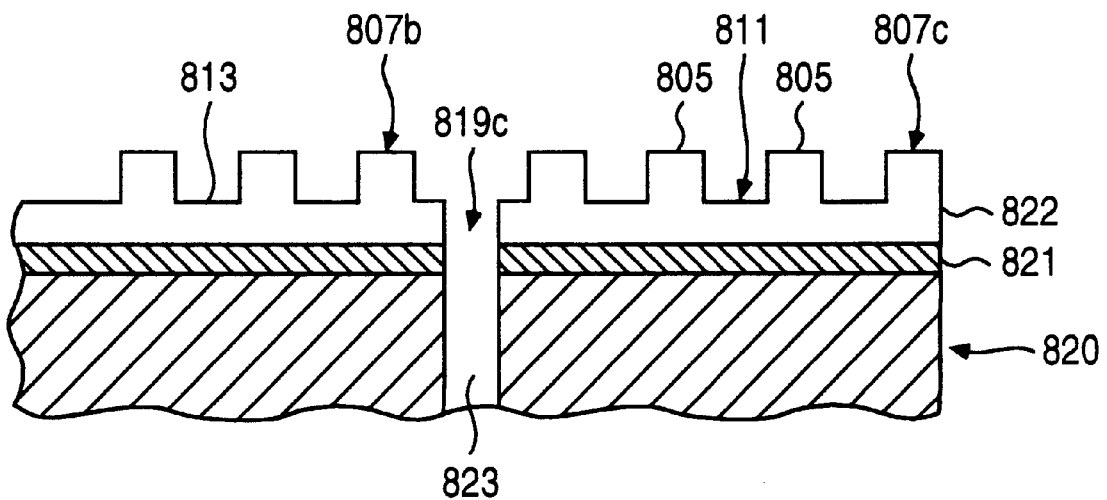
FIG. 8B shows a cross-sectional view of a portion of this vacuum chuck.

Orifices 819a, 819b, and 819c separately provide a vacuum to the surface of the vacuum chuck. There are three pins 817a–c located, in this embodiment, within circle 815. The three pins 817a–c lift the wafer vertically off the vacuum chuck 800 to allow a robotic arm to pick up the wafer. The three pins 817a–c are placed in the smallest circle 815, where it is able to lift or support a wafer of any size. It will be apparent that other means may be used to lift the wafer and that the pins 817a–c may be placed other than as shown in FIG. 8A. FIG. 8B shows a cross-sectional view of a portion of the vacuum chuck of FIG. 8A.

The bearing plate 822 has been bonded by the adhesive layer 821 to the substrate 820 according to a method of the present invention, such as the method shown in FIG. 4A. The orifice 819c is a hole through the entire plate 822 and is in fluid communication with a vacuum generator which is coupled to the duct 823 in the substrate 820. The adhesive layer 822 was applied in a manner to avoid blocking the fluid communication between the duct 823 and the orifice 819c even after pressure is applied to press the plate 822 toward the substrate while the adhesive hardens and the face surface of plate 822 is pressed against a predetermined surface. The rim 807c, rim 807b, and pillars 805 may be formed by etching the face surface of the plate 822.

The area around the pillars, such as sectors 811, 813 and 815 serve a similar function as the grooves in the face surface of a bearing plate of a fluid bearing. It will be appreciated that the pillars 805 may be replaced with pin-shaped pillars which provide a very small surface area at the top of each pin-shaped pillar. These pin-shaped pillars may still provide support (e.g. for a semiconductor wafer as in the case of a wafer pin chuck) and yet not provide much surface area for dust particles to collect at the top surface of the pin-shaped pillars. Such a "wafer pin chuck" would allow a wafer to be supported in a very flat manner, which is useful in wafer inspection systems. Fabricating such a wafer pin chuck is relatively simple and inexpensive using the techniques of the present invention.

In the prior art, a pattern as complex as the one shown in FIG. 8A would probably not have been used because of the excessive time and cost to engrave or mill each square 805. In contrast, under the present inventive method, the squares are easily drawn using, for example, a CAD program, which automatically creates the computer file required for generating the pattern on the master photomask. Once the master photomask is created, the pattern can easily be repeated during a standard etch of a material, such as aluminum, to create the plate for the vacuum chuck 800.

Figure 9:
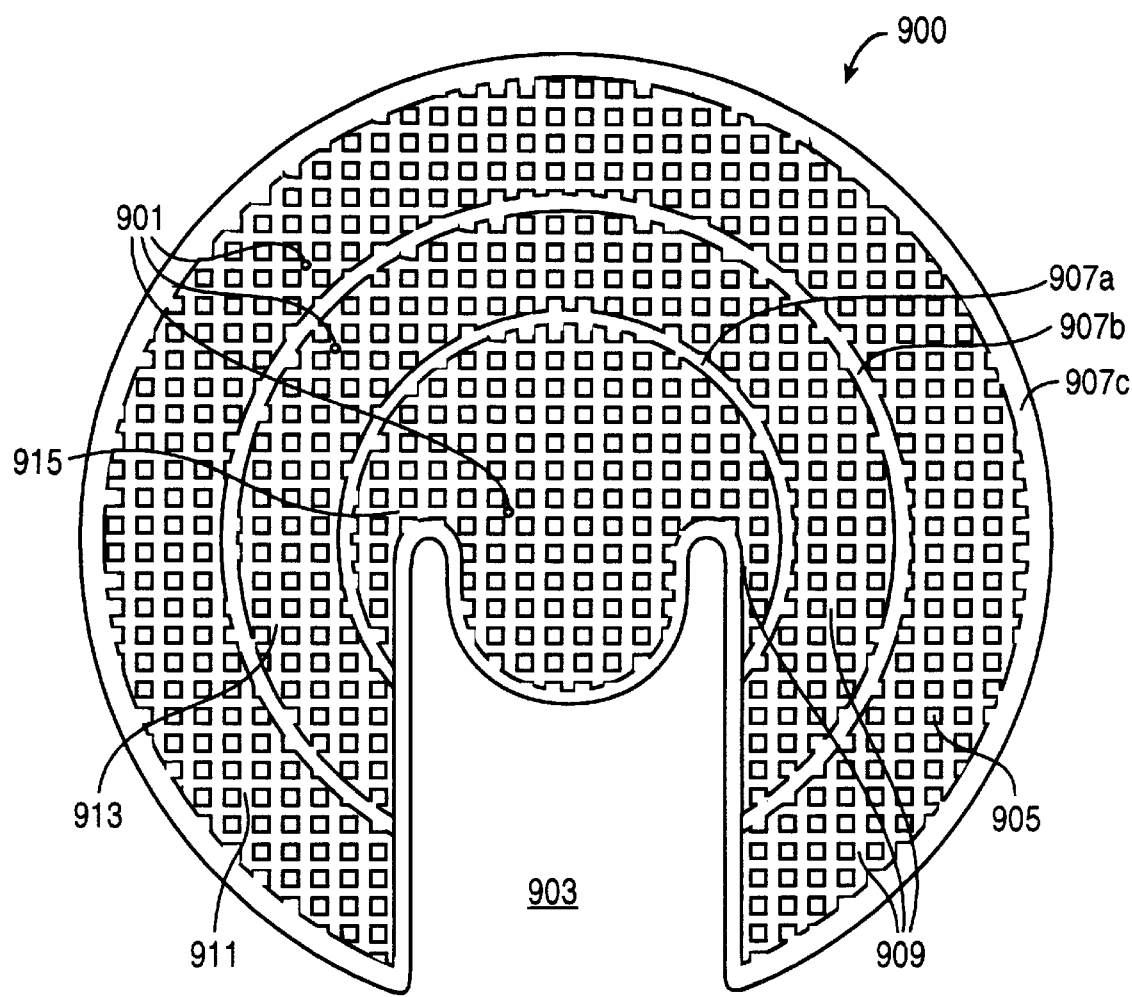
FIG. 9 illustrates another embodiment of a vacuum chuck that was formed using the present invention.

Referring to FIG. 9, one embodiment of a vacuum chuck that was formed according to the present invention is illustrated. A top view of the vacuum chuck plate is shown in FIG. 9. The vacuum chuck body (not shown) is disposed below the vacuum chuck plate. A robotic arm 903 can be used to move a wafer on and off the vacuum chuck 900. In one embodiment, a smaller concentric circle 915 is used to support a four-inch wafer. A six-inch wafer may be supported on the larger ring 913, while an eight-inch wafer may be supported on the entire vacuum chuck 900, which includes concentric area 911. In addition, a through-hole 901 is shown in each concentric circle, 915, 913 and 911, respectively. In one embodiment, the through-hole has a diameter of about 0.040 inch. Vacuum or a pressure differential may be provided through hole 901. The rims 907 around each concentric circle are not etched. The area 909 around each of the square islands 905 has been etched using standard lithography techniques. The area 909 serves a similar function as the grooves in a fluid bearing. Under the prior art method, it is a very time-consuming and expensive process for a machine to slowly engrave each square island 905 one by one. The machine can only engrave or mill such a pattern on a single vacuum chuck one at a time.

In contrast, using the present invention, the vacuum chuck plate pattern of many squares 905 can be etched once using a photoplotter to create a master photomask. But from that one master photomask pattern, the same pattern can be quickly and easily etched on subsequent plates to form additional vacuum chuck plates. The plate can be made of any material that can be etched, such as aluminum, stainless steel, glass, or ceramic. In one embodiment, the vacuum chuck plate is then bonded using an adhesive to a vacuum chuck body using the replication process that was described earlier for the fluid bearing.

Figures 10, 11:
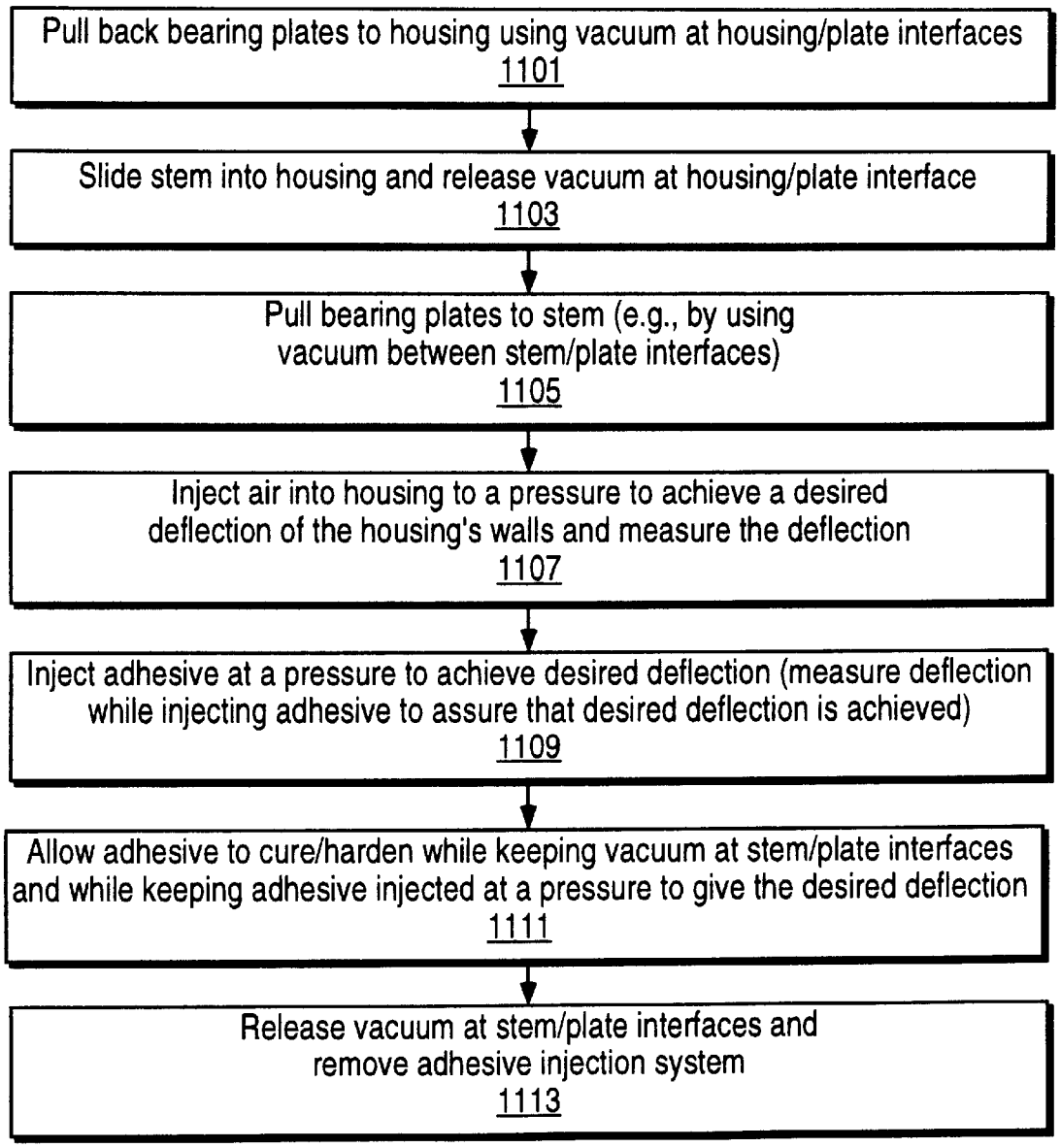
FIG. 10 illustrates one embodiment of a guideway that was formed using the present invention.
FIG. 11 is a flowchart which shows another method according to the present invention.

Referring to FIG. 10, a method of manufacturing an almost infinite length guideway is illustrated. In the prior art, a guideway was fabricated out of a solid block of granite or aluminum that was lapped until it was flat and smooth.

Consequently, fabricating a guideway was very expensive and the maximum length of the manufactured guideway was about three to four feet in length. Thus, fluid bearings could not travel great distances because of the limited length of the guideway. Using aspects of the present invention, a guideway can be manufactured at a lower cost and for considerably longer lengths. The process involves the use of a flatness master 1001, which causes the guideway to be flat, a top plate 1003 and an adhesive 1005 to bind the top plate 1003 to a body 1007.

In a preferred embodiment, the top plate 1003 and the body 1007 have a similar coefficient of expansion. In one embodiment, the top plate 1003 is made of plate glass and the body 1007 is made of fiberglass pulltrusion. In yet another embodiment, the adhesive 1005 used can be epoxy or polyester. In still another embodiment, the top plate 1003 is made of metal tape and the body 1007 is made of a metal extrusion. All of these above-described materials cost less than the cost of granite or aluminum guideways made by grinding or lapping. It will be appreciated that other materials may also be used to form top plate 1003 and body 1007. The flatness master is a vacuum air bearing in one embodiment. The vacuum air bearing may be formed using the present invention. Moreover, heat can be applied or supplied to the flatness master 1001 to help the adhesive 1003 to cure and thus, bond the top plate 1003 to the body 1007.

A guideway of a fixed length can be made as illustrated in FIG. 10 in which the flatness master is placed over the top plate 1003, a layer of adhesive 1005 and the body 1007, while vacuum is applied through the flatness master 1001. In one embodiment, the flatness master 1001 is a vacuum air bearing which allows air to escape as well as allowing a vacuum to be supplied. To make a guideway of an almost infinite length, a continuous supply of the top plate 1003 material, adhesive 1005 and the body 1007 material must be continuously fed and supplied as they move underneath the flatness master 1001. For example, if the top plate 1003 is made of plate glass, a continuous supply of plate glass must be provided as well as a continuous supply of fiberglass pulltrusion if that is what the body 1007 comprises. Or in another example, a roll of metal tape must be continuously supplied if the top plate 1003 is made of metal tape. The end of a roll of metal tape is spliced and a new metal tape is added next to it. There may be a few little gaps between the end of one roll of metal tape and the next roll, but the gaps can be filled in and polished to obtain a smooth guideway.

With aspects of the present invention, the thickness of the plate glass used as a top plate 1003, in one embodiment, does not matter. Moreover, the curing process of the adhesive used dictates the amount of heat provided to the flatness master 1001. The type and amount of adhesive used determines the required time period for curing and the temperature. In addition, the size of the flatness master 1001 influences the time and temperature used during the curing process. The present invention therefore provides methods which are capable of manufacturing guideways of very long lengths in a very cost-efficient manner. This should expand the use of guideways and air bearings by making them more commercially attractive. For instance, air bearings may be used on luggage carts in airport luggage handling areas, which glide on guideways that were made using the present inventive method. Another example is to use the present invention to form fluid bearings that are placed on doors, which glide on guideways that were also made according to the present invention.

Figure 12A:
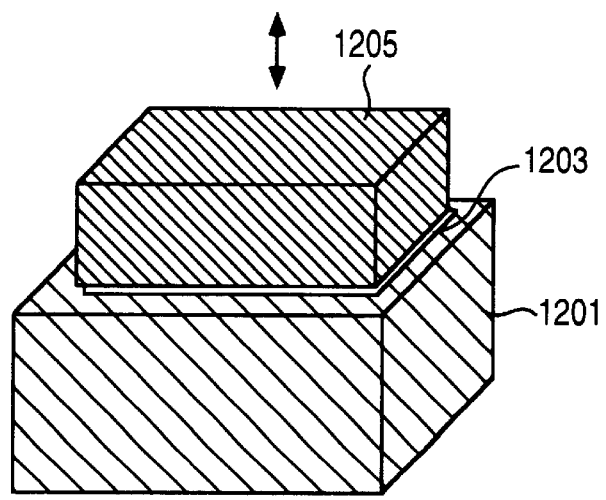
FIG. 12A shows a perspective view of a positioning system using air bearings of the present invention.

FIGS. 11, 12a, 12b and 12c illustrate yet another embodiment of the present invention. According to this embodiment, a novel fluid bearing is created between a housing 1201 and a guideway 1205 using a novel method of the present invention. FIG. 12A shows a perspective view of the fluid bearing created between the guideway 1205 and the housing 1201 which allows the guideway 1205 to move relative to the housing 1201. It will be appreciated that the housing may be moved relative to the guideway 1205. The fluid bearing includes a gap 1203 which separates the guideway surfaces from the inner surfaces of the housing 1201. This guideway and housing assembly may be used, for example, to create a Z movement stage for a wafer prober, such as the wafer probers manufactured by Electroglas of Santa Clara, Calif. Other uses of this guideway will be appreciated by those in the art.

Figure 12B:
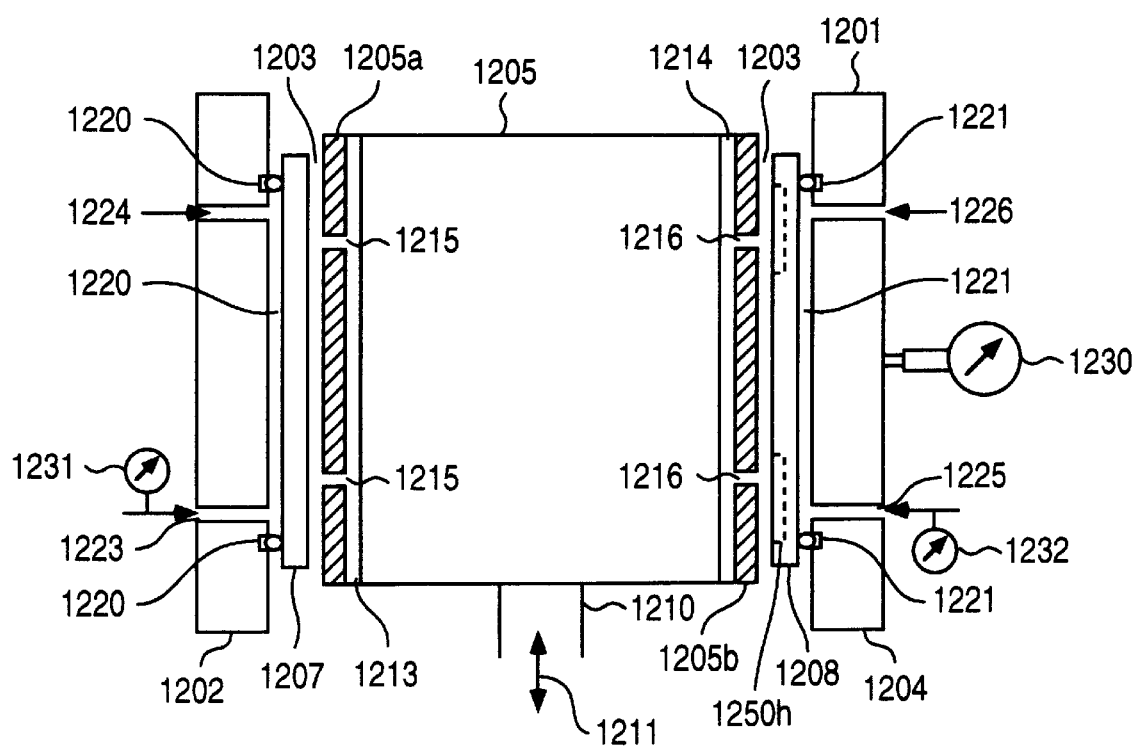
FIG. 12B show a cross-sectional view of a positioning system as in FIG. 12A.
Figure 12C:
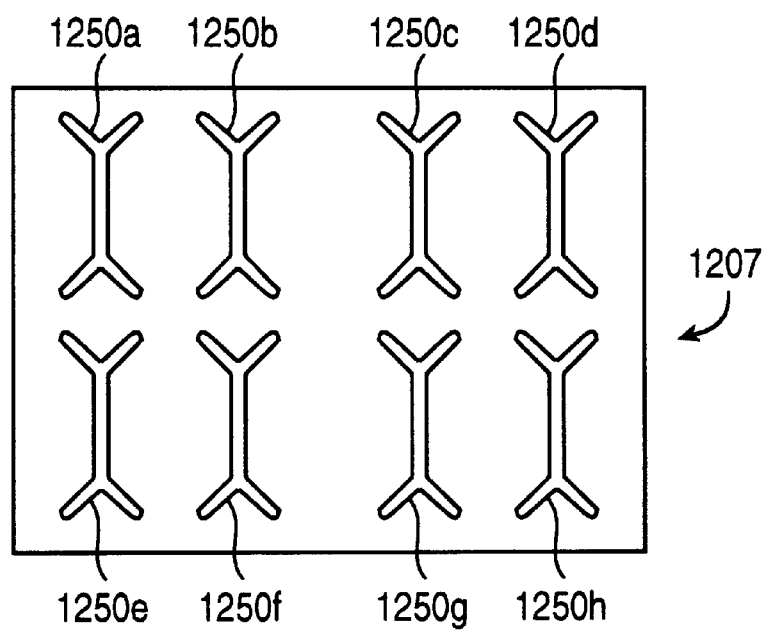
FIG. 12C shows an example of a surface of a bearing plate which may be used with embodiments of the present invention.
Figure 12D:
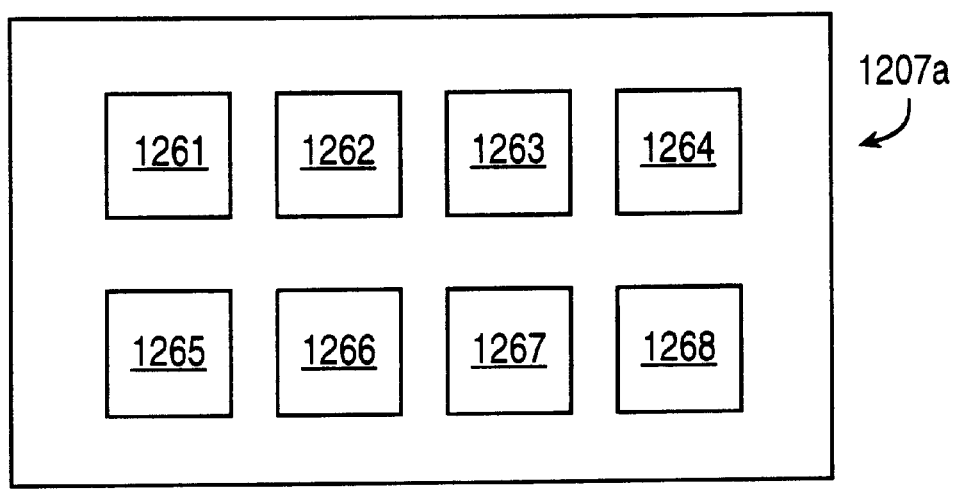
FIG. 12D shows another example of a surface of a bearing plate which may be used with embodiments of the present invention.

FIG. 12B shows a cross-sectional view of the housing 1201 with the guideway 1205 inserted therein. FIG. 12C shows an example of a bearing plate, such as bearing plate 1207 which contains eight etched patterns which form grooves in the face surface of the bearing plate 1207. These etched grooves 1250a through 1250h provide for even distribution with separate air bearing circuits across the entire face surface of the bearing plate. FIG. 12D shows an alternative bearing plate 1207a which may be formed from a material which may be etched or sandblasted. In one particular embodiment, the bearing plate 1207a is formed from a glass plate. This plate has formed on the face surface of the bearing plate rectangular recesses which may be sandblasted onto the face surface. In the example shown in FIG. 12D, eight rectangular recesses 1261–1268 are formed on the face surface of the bearing plate 1207a by sandblasting these recesses. Each of the recesses may receive a separate vacuum circuit in order to provide uniform strength and resistance of the bearing over the entire surface of the bearing plate 1207*a*.

Four bearing plates are attached to the inner surface walls of the housing 1204, and these plates allow the guideway 1205 to glide up and down along the air bearing created between the plates and the guideway's outer surfaces. As shown in the cross-sectional view of FIG. 12B, two plates 1207 and 1208 are attached to the inner walls of the housing 1201 by an adhesive which is allowed to harden during at least a portion of the time that the plate is pressed against the outer surface of the guideway 1205. This will be described further with reference to FIG. 11 below. In one embodiment, the plates may be fabricated from a glass material and bonded using an epoxy to the inner walls of the housing 1201 which may be formed out of an aluminum honeycomb structure which is flexible in a direction which is perpendicular to the movement of the guideway 1205.

The guideway 1205 includes an air channel or fluid channel, such as channels 1213 and 1214 within each wall of the guideway 1205. These channels are in fluid communication with outlets on each side, such as the outlets 1215 which are in fluid communication with the channel 1213 on the left side of the cross-sectional view of the guideway 1205 shown in FIG. 12B. Similarly, outlets 1216 are in fluid communication with the channel 1214 on the right side of the cross-sectional view of the guideway 1205. The left wall 1205*a* includes holes which form the outlets, such as outlets 1215. Similarly, the right side wall 1205*b* includes holes which form the outlets 1216. The guideway 1205 is mounted on a support 1210 which provides motion up and down as shown by arrow 1211 for the guideway 1205. The support 1210 may be, for example, a screw or some other support device which provides motion for the guideway 1205. The outlets 1215 and 1216 may provide either air in the case of an air bearing when the guideway is operating or vacuum during the manufacturing process described below for fabricating the guideway and housing air bearing. During operation air provided through the channels 1213 and 1214 exits the outlets 1215 and 1216 and impinges upon the bearing plates 1207 and 1208 in order to create an air bearing in the gaps 1203 thereby allowing the guideway 1205 to slide up and down within the housing 1201.

As noted above, the housing 1201 is preferably formed out of a material which is flexible in a direction perpendicular to the direction of movement of the guideway 1205. An example of this type of material is an aluminum housing which has honeycomb-like ribs running within the walls of the housing 1201. Holes are formed in these walls in order to provide inlets and outlets which are used during the fabrication process as described below. For example, holes 1223 and 1224 in the wall 1202 are used during the manufacturing process to create a vacuum in the gap 1220 or to inject adhesive into this gap. Similarly, the holes 1225 and 1226 allow for the creation of a vacuum in the gap 1221 or the injection of an adhesive into this gap. A seal, for example, O-rings 1220 is used to seal the gap between the plate 1207 and the inner face of the wall 1202. An O-rings groove in wall 1202 may be made to accept the seal. Similarly, seal 1221 serves to seal the interface between the bonding surface of the bearing plate 1208 and the inner wall surface of the wall 1204 of the housing 1201. These seals are typically fixed by an adhesive to the inner wall of the housing 1201.

FIG. 11 will now be described in conjunction with FIG. 12B to illustrate a method for manufacturing the guideway and housing fluid bearing according to one method of the present invention. In step 1101, the bearing plates are pulled back towards the inner walls of the housing by using a vacuum at the housing/plate interfaces. Thus, for example, by plugging holes 1224 and 1226 and by applying a vacuum to holes 1223 and 1225 the plates 1207 and 1208 may be pulled back towards walls 1202 and 1204 to the vacuum created in the gaps 1220 and 1221. This increases the area within the housing 1201 and makes it easier to slide the guideway into the housing while the vacuum is maintained. Thus in step 1103, the guideway is slid into the housing and the vacuum is released at the housing/plate interface. Then in step 1105 a vacuum is created between the guideway/plate interfaces to pull the bearing plates to the guideway's outer surfaces (thereby reducing the gap 1203). This is done by connecting a source of vacuum to the channels 1213 and 1214 in the guideway 1205. While keeping the bearing plates pulled towards the guideway by the use of the vacuum described in step 1105, air is injected into the housing through the openings 1223 and 1225 while keeping the openings 1224 and 1226 plugged. In this manner, the gap 1220 and the gap 1221 is pressurized which tends to push the plates 1207 and 1208 toward their respective walls of the guideway 1205. This also tends to deflect the outside walls of the housing 1201 in a perpendicular direction away from the direction of motion of the guideway 1205. This deflection is minimal at the corners of the housing which are relatively stiff; deflection tends to be maximized at the middle portions of each wall of the housing 1201. The air which is injected in step 1107 into the housing is injected at a pressure to achieve a desired deflection of the housing's walls. This deflection may be measured by a dial indicator or other meter device such as meter 1230. An air pressure gauge 1231 may also be used to measure the pressure which achieves the desired deflection. After determining the desired deflection, the air source is removed from the openings 1223 and 1225 and the openings 1224 and 1226 are opened to allow the injection of adhesive in step 1109. Adhesive is injected at a pressure through openings 1223 and 1225. The pressure used to inject the adhesive is used to achieve the same desired deflection which was measured in step 1107. That is, while injecting the adhesive, the deflection of the outer wall of the housing 1201 may be measured along each wall to verify and assure that the deflection is as desired while the adhesive is injected. Also while the adhesive is being injected, the bearing plate continues to be pulled toward the guideway/plate interface by the vacuum created through the channels 1213 and 1214. In this manner, the bearing plates are pushed towards the walls of the guideway 1205 by both the vacuum at the guideway/plate interface and by the adhesive which is injected into the interface between the housing wall and the bonding surface of each bearing plate. The adhesive is allowed to cure/harden in step 1111 while keeping the vacuum at the guideway/plate interfaces and while keeping the adhesive injected at a pressure to give the desired deflection. After the adhesive has sufficiently hardened, the vacuum at the guideway/plate interface may be released and the adhesive injection system may be removed. The openings in the outer walls 1202 and 1204 may be sealed and the fabrication of the guideway and housing fluid bearing is completed according to one method of the present invention.

It is to be appreciated that although the present invention has been used to form a fluid bearing, or a vacuum chuck or a guideway, these embodiments are meant to be illustrative and not limiting. It will also be apparent that the present invention may be used to form fluid bearings, vacuum chucks and guideways that have different configurations than those shown in the appended figures.

The foregoing description provides examples of methods for manufacturing fluid bearings, vacuum chucks or guideways. The present invention is not limited to the examples provided in the detailed description, but can be used to form any machine or tool in which smooth and controlled motion is desired. It will be appreciated that numerous modifications may be made in practicing the present invention without departing from the spirit and scope of the invention, which is defined by the following claims.

What is claimed is:

1. A method of forming a guideway, comprising:
    providing a face plate of a guideway having a face surface and a bonding surface opposing the face surface;
    bonding the bonding surface of the face plate to a body; and
    generating a pressure difference between the body and a predetermined surface to conform the face surface of the face plate to the predetermined surface.

2. The method of claim 1, further comprising
    heating the predetermined surface.

3. The method of claim 1, wherein the bonding uses an adhesive which is flexible before hardening and wherein said pressure difference conforms said face surface during at least a portion of time that said adhesive hardens.

4. The method of claim 1, wherein the face plate and the body have a similar coefficient of expansion.

5. The method of claim 1, wherein the face plate is plate glass and the body is a fiberglass pulltrusion.

6. The method of claim 1, wherein the face plate is a metal tape and the body is a metal extrusion.

7. The method of claim 1, wherein the predetermined surface comprises a vacuum generating surface.

8. The method of claim 1, wherein the generating pressure difference comprises generating a vacuum on the face surface of the face plate, the vacuum causing the face surface of the face plate to conform to the predetermined surface.

9. The method of claim 3, further comprising removing the pressure difference, after the adhesive has hardened, to detach the face plate conformed with the predetermined surface from the body.

10. The method of claim 1, wherein the generating a pressure difference comprises:
    applying a first pressure on the bonding surface of the face plate; and
    applying a second pressure on the face surface of the face plate, the second pressure being substantially less than the first pressure.

11. The method of claim 10, wherein the first pressure is at or above atmospheric pressure and the second pressure is a vacuum pressure.

* * * * *